May 21, 1935.  M. MAUL  2,002,437

MECHANICAL METHOD OF PREPARING STATEMENTS, BILLS, AND THE LIKE

Filed July 15, 1931  10 Sheets-Sheet 1

| | | | | |
|---|---|---|---|---|
| ○ ○○ ○ ○○ | Robert Walsh<br>7 East 9th Str.<br>New York<br>6420 | 6 420 | 3 680 | 84 300 |
| ○ ○○ ○ ○○ | Fred Simon<br>8 Hudson Str.<br>New York<br>6425 | 6 425 | 1 230 | 17 410 |
| ○ ○○ ○ ○○ | Fred Simon<br>8 Hudson Str.<br>New York<br>6425 | 6 425 | 1 680 | 36 000 |
| ○ ○○ ○ ○ | Ernst Weiss<br>16 Marks Str.<br>Chicago<br>6431 | 6 431 | 630 | 5 000 |

| | | | | |
|---|---|---|---|---|
| ○ ○○ ○ ○ | Ernst Weiss<br>16 Marks Str.<br>Chicago<br>6431 | 6 431 * | 630 | 5 000 |
| ○ ○ ○ ○ ○ ○ | John Bruce<br>12 West 8th Str.<br>New York<br>6432 | 6 432 * | 16 430 | 122 688 |
| ○ ○ ○ ○ ○ ○○ | Fritz Rau<br>2 Park Place<br>Boston<br>6435 | 6 435 * | 8 500 | 96 320 |

*Fig. 4*

Inventor:

Michael Maul

Fig. 5

| | | | |
|---|---|---|---|
| Albert Graig | 3 685 | 650 | 2 000 |
| 8 Vernon Str. | 3 685 | 1 320 | 35 625 |
| New York | 3 685 | 68 | 325 |
| 3685 | 3 685 | 3 282 | 400 |
| | | * 5 320 | 38 350 |
| Karl Schulze | 3 686 | 2 600 | 16 000 |
| 7 West Str. | 3 686 | 355 | 380 |
| Albany | 3 686 | 1 820 | 4 230 |
| 3686 | | * 4 775 | 20 610 |

Fig. 6

| | | | |
|---|---|---|---|
| Albert Graig | 3 685 | 650 | 2 000 |
| 8 Vernon Str. | | 1 320 | 35 625 |
| New York | | 68 | 325 |
| 3685 | | 3 282 | 400 |
| Karl Schulze | 3 686 | 2 600 | 16 000 |
| 7 West Str. | | 355 | 380 |
| Albany | | 1 820 | 4 230 |
| 3686 | | | |
| John Miller | 3 690 | 45 000 | 657 |
| 3 Ocean Ave. | | 534 | 6 545 |
| Boston | | 16 345 | 5 055 |
| 3690 | | 3 650 | 35 |
| | | 75 357 | 5 775 |

*Inventor:*
Michael Maul

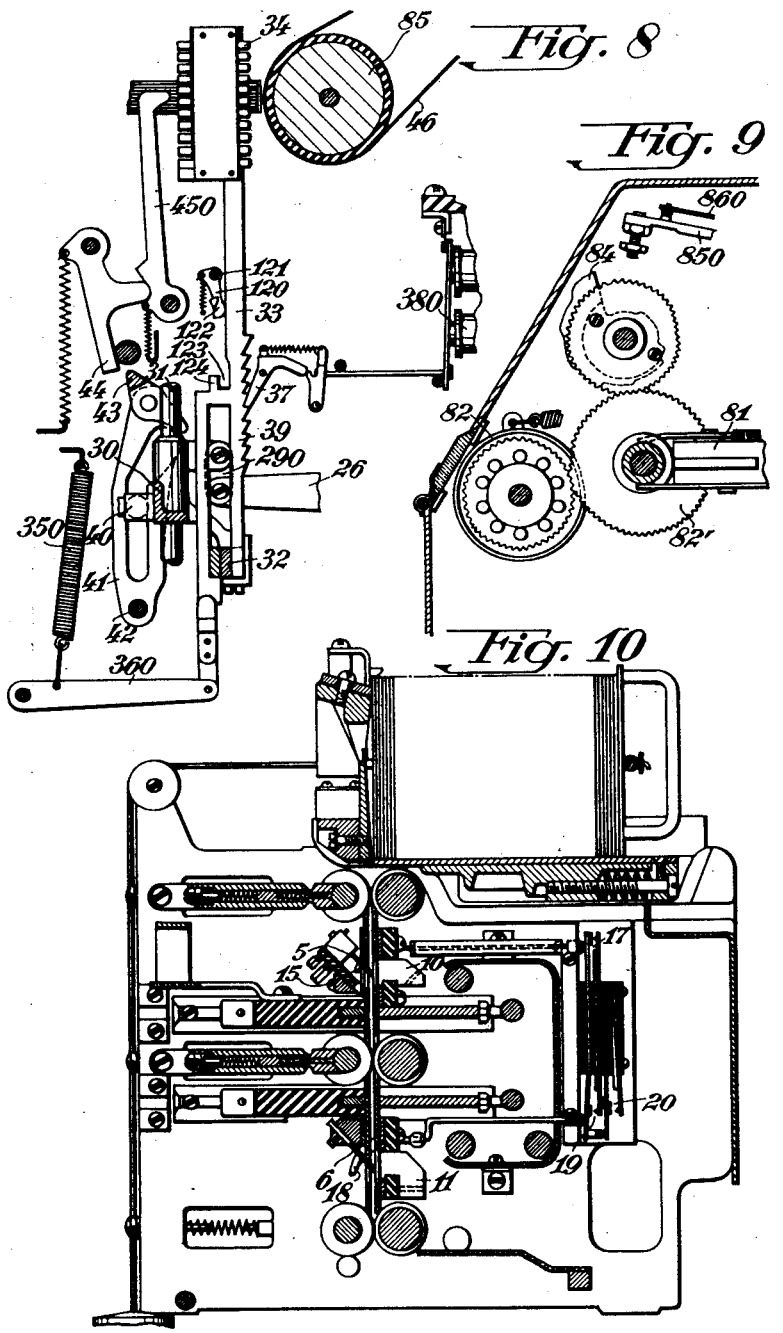

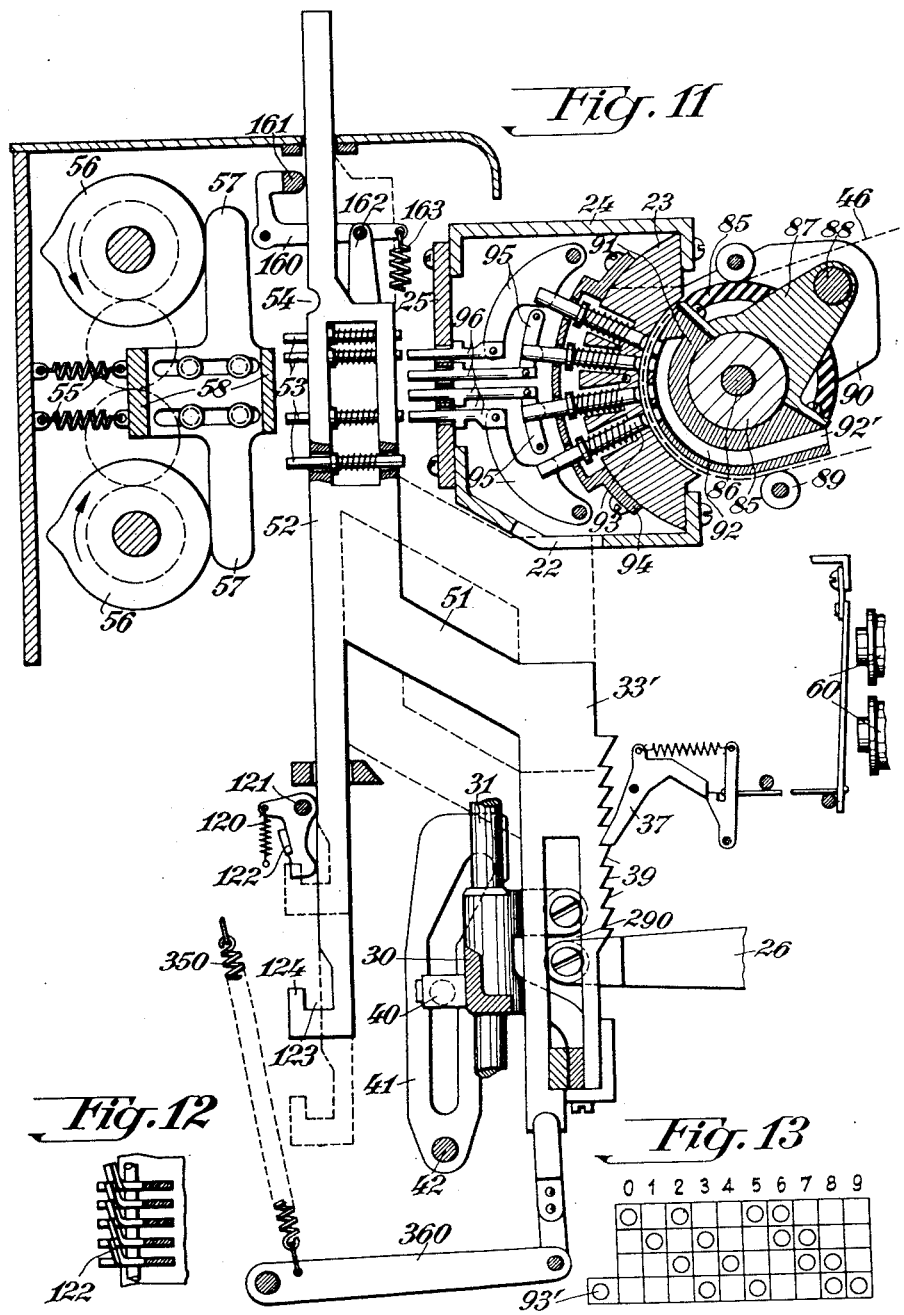

May 21, 1935. M. MAUL 2,002,437
MECHANICAL METHOD OF PREPARING STATEMENTS, BILLS, AND THE LIKE
Filed July 15, 1931 10 Sheets-Sheet 6
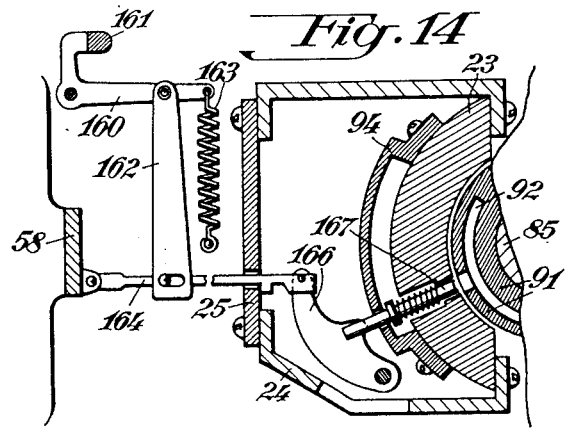
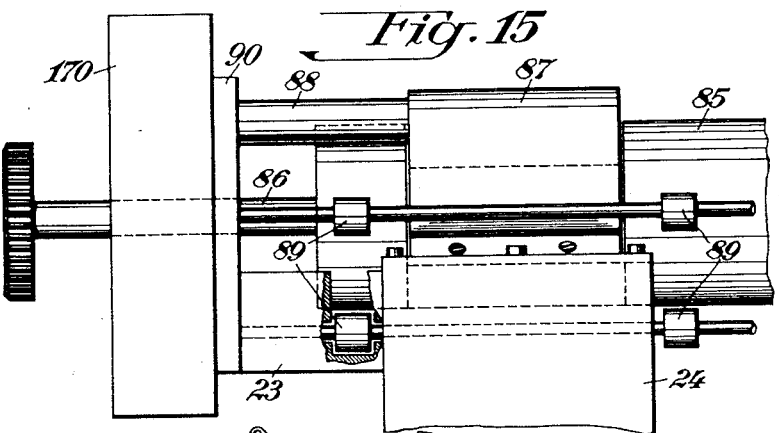
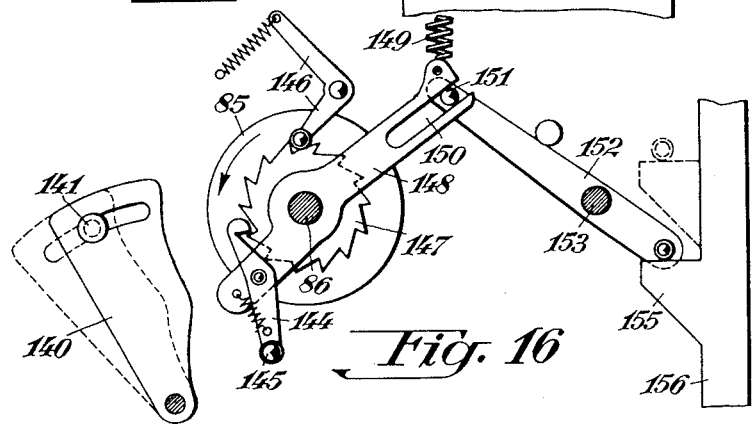
Inventor:
Michael Maul

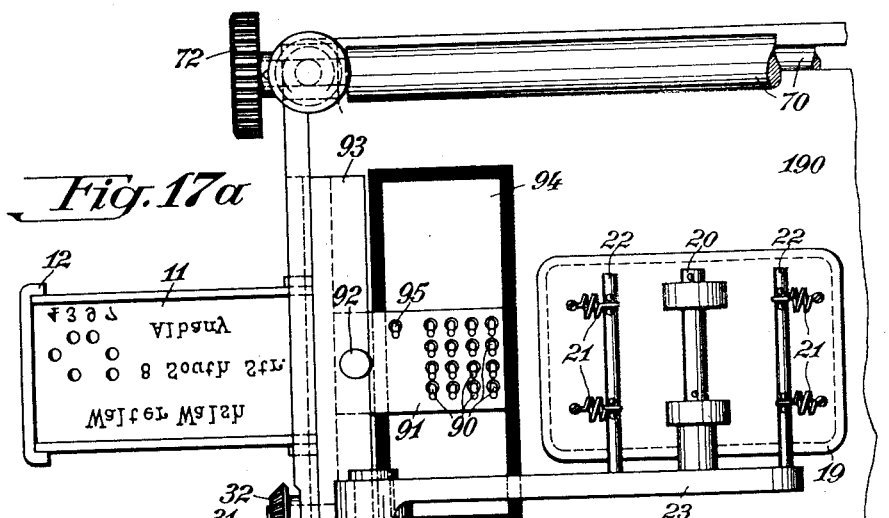

May 21, 1935.                M. MAUL                 2,002,437
MECHANICAL METHOD OF PREPARING STATEMENTS, BILLS, AND THE LIKE
Filed July 15, 1931         10 Sheets-Sheet 8
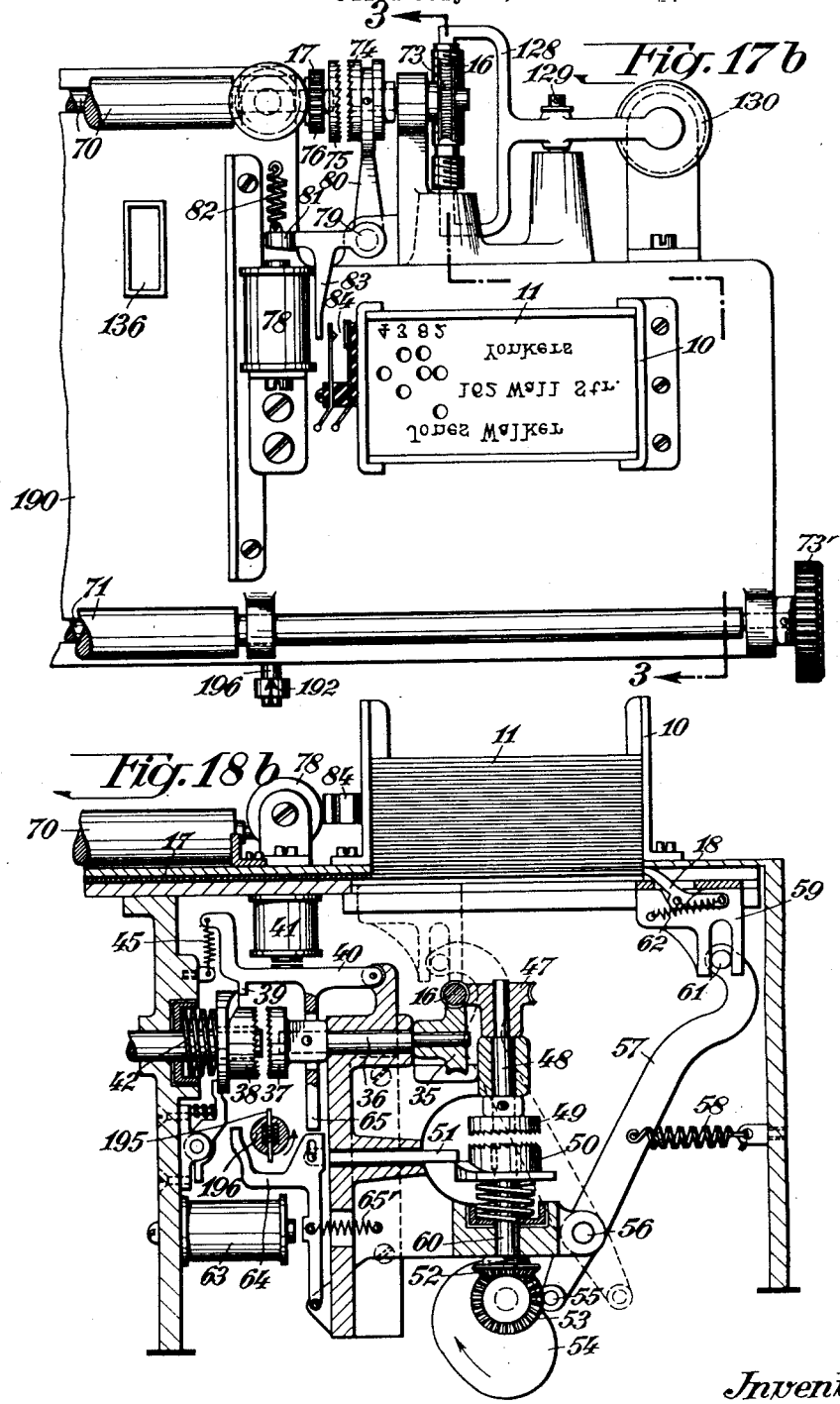
Inventor:
Michael Maul

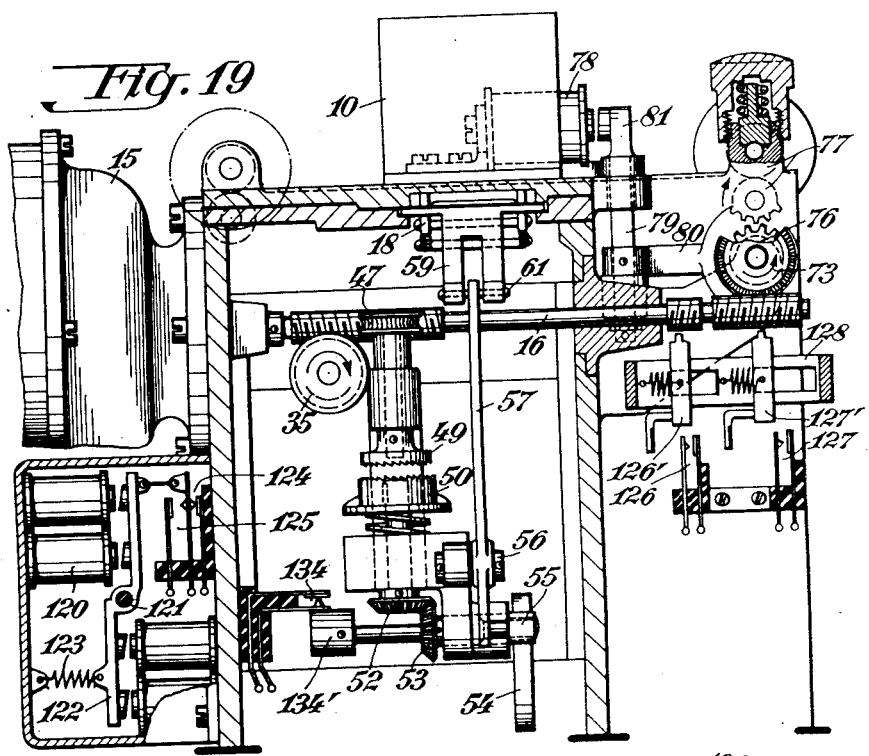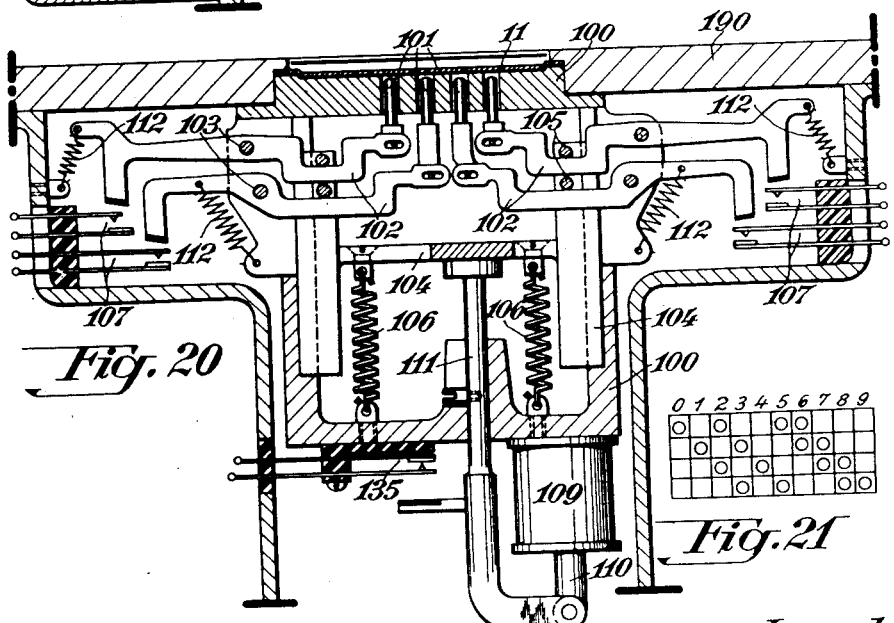

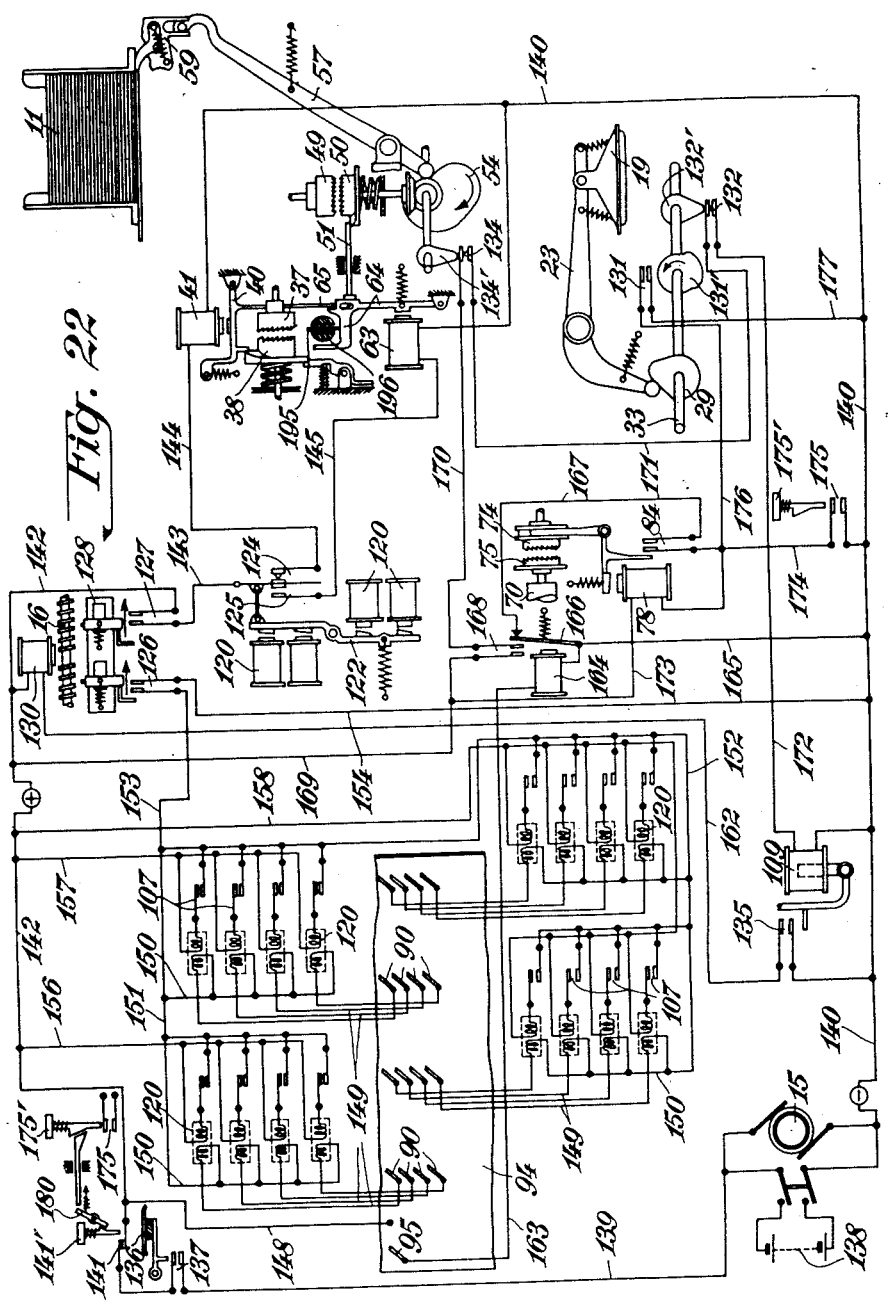

Patented May 21, 1935

2,002,437

UNITED STATES PATENT OFFICE 2,002,437

MECHANICAL METHOD OF PREPARING STATEMENTS, BILLS, AND THE LIKE

Michael Maul, Berlin-Johamiesthal, Germany

Application July 15, 1931, Serial No. 550,939
In Germany July 26, 1930

20 Claims. (Cl. 101—47)

The present invention relates to a novel mechanical method of preparing statements, bills and the like records by which method various sorts of bookkeeping work may be carried out with great advantages as compared to the methods used heretofore; the novel method is of particular importance in connection with the well known perforated record card system and opens new and broad fields for the application of the last named system, however, the novel method is also adapted to increase the appliance of the usual adding and calculating machines in connection with address printing machines which latter are preferably used for carrying out the novel method.

The essential characteristic of statements, bills and the like records here in question is the fact that they bear numerical accounting data and in addition thereto a designation of some kind which indicates to whom the record or the accounting data respectively relate. Thus for instance a statement of a bank account bears debit numbers, credit numbers and the corresponding balance; in addition thereto also the name of the customer of the bank will be indicated on the statement or at least a designation number coordinated to the respective customer. In a gas or electricity bill the previous and the present state of the meter will be indicated and the consumption as well as the corresponding price will also be given; in addition thereto, of course, the name or designation number or both are indicated on the record in addition to the numerical accounting data represented by the consumption and the price. In the insurance business the numerical accounting data will indicate the amount of the premium and in addition thereto some designation of the insured person is given on the record, preferably the name and the address. Of course, on records of the character indicated other numbers and data may be found, as for instance the date or the age of a person, the manner of a business transaction and the like; however, the substantial contents of interest in connection with the present novel method is what has been termed above the "numerical accounting data" and the corresponding "designation" which may be only a number and/or the name and address. Therefore in the following specification reference will be made to numerical accounting data and designations in the above indicated meaning.

Statements and the like records referred to may now be prepared by mechanical means in various ways:

The numerical accounting data may be entered upon the records by an ordinary typewriter which, of course, permits also entering of the name and address; this manner of preparing statements is, however, only possible if no computing or calculating operations are to be effected by the machine since an ordinary typewriter is not adapted to mechanically carry out said operations. If for instance bills containing only single items without totals shall be prepared and addressed, such work may be effected in the indicated manner; the latter, however, is not only lacking the possibility of permitting mechanical computing or calculating operations but due to the mere manual actuation of the typewriter it involves also a low efficiency and can in no way be considered as a fast and more or less automatic work.

Of course, in the example indicated in the foregoing passage, the totals or other numerical accounting data resulting from the various items on the record may be obtained in a separate adding or calculating machine and then entered into the respective records; however, this would rather complicate and possibly even confuse the work and moreover the efficiency would be greatly reduced.

Statements and the like records of the type referred to may, however, also be prepared in another manner: In this instance ordinary adding or calculating machines or even cash registers are used; such machines are equipped with numerical printing devices; accordingly the numerical accounting data, the items as well as the results and the like may be printed. Since said machines are, however, not equipped with means permitting to print the name and address, only a designation number can be printed together with the numerical accounting data in order to identify the latter. It will therefore be seen that the last mentioned way permits the adding and calculating operations but excludes the addressing step of the records which must be effected later on, if desired.

The difficulties mentioned above have led to the construction of adding, computing or calculating typewriting machines adapted to meet both above mentioned requirements: they permit entering of the numerical accounting data, additions, calculating and so on and entering of the result; and at the same time the name and address representing the designation and belonging to the numerical accounting data may be printed; in addition thereto, of course, also other information may be printed upon the record by the typewriting mechanism of the machine. The last mentioned type of machines are a great advance in the indicated direction of mechanical preparation of records, however, due to their construction, they are comparatively expensive and the manual control and supervision are still necessary to a large extent.

Now, there is a further type of machines which are used at an increasing rate for bookkeeping work and the like: These are the perforated record card controlled machines. It is well known that in the perforated record card system numbers (numerical accounting data in the meaning of the present application as well as designation numbers) are punched symbolically upon record cards, that the cards are then sorted according to certain designations by sorting machines and that the cards operate then automatically the tabulating machines. If once the cards are prepared, the work is almost entirely automatic and may be carried out with great speed, and moreover calculations or records or statements or statistics according to the most various view points may be obtained. Printing tabulating machines, however, are usually only equipped with accumulating, subtracting and/or calculating devices and are only adapted to print numbers; accordingly, the numerical accounting data in the meaning of the present application and the designation numbers associated thereto may be printed by tabulating machines; however, address printing is usually impossible with record card controlled tabulating machines. As regards the possibility of preparing records mechanically, the tabulating machines must be grouped in the same class as the adding and calculating machines and cash registers, i. e. in the class of machines which do not permit printing of the name and address.

Though the perforated record card system is now widely used even for bookkeeping purposes, the fact that printing of the full name and address was usually not possible has prevented the use of said system in work of various sort. For instance in the banking business the customer desires on his statement of account not only the designation number (being identical in this instance to the account number) but he also desires at least his name thereon; in the preparation of gas and electricity bills it may become almost imperative to print the name and address upon the statement or bill.

Now, it has already been attempted to solve the problem indicated in the foregoing passages. For that purpose tabulating machines have been equipped with so called alphabet printing devices so that not only numerical data but also names and addresses can be printed under record card control. Such perforated record card controlled address printing devices, however, increase the volume and the costs of the machine considerably and reduce the operating speed and therewith the general efficiency of the machine; the most important point is, however, that this method requires the representation of the name and address on the record cards thereby increasing considerably the card material; since in the perforated record card system the costs for the cards amount to a considerable fraction of the entire costs of the system, it will be quite obvious that obtaining of addressing work in the above indicated manner in connection with the perforated record card system has many and serious draw backs.

To solve the problem indicated it has further been suggested simply to add an addressing machine to the tabulating machine and to feed the address plates through the machine; however, since no provision for proper selection of address plates and record sheets by each other has been made, the practical reliability of such a mechanism and safety of proper addressing of the records are uncertain and moreover the speed of the tabulating machine and of the addressing machine are depending upon one another thus preventing to use each separate mechanism with its optimum efficiency.

It is now the main aim of the present invention to provide a novel mechanical method of preparing statements, bills and the like records in a manner permitting to make use of all advantages of the perforated record card system without increasing the card size and without providing complicated alphabet printing devices or the like in the tabulating machine, and which method notwithstanding permits printing of the name and address on the records to be prepared. The method also permits high efficiency without reducing or interfering with the high operating speed characteristic to the perforated record card system. Though the invention is probably of the greatest practical importance in connection with the perforated record card system it may also be used in connection with other accounting machines of the type having no address printing mechanism and belonging therefore in that respect to the same class as the tabulating machines as has been previously indicated. Accordingly, also ordinary adding and calculating machines or cash registers may be used for carrying out the novel method according to the invention in connection with punching and address printing means still to be referred to.

In addition to machines for entering the numerical accounting data and the corresponding designation numbers upon records (such as adding, calculating and record card controlled tabulating machines) the present invention makes also use of a punching mechanism through which designation number perforations are provided upon said records; further the invention makes use of address carriers and of suitable means permitting to transfer the addresses upon said records; for that purpose designation number indexes associated to said address carriers and the designation number perforations of said records are analyzed and compared and upon agreement the address is printed upon the corresponding record. Broadly, the novel method consists therefore in printing numerical accounting data associated to different designation numbers upon records; punching upon the same records to said numerical data the corresponding designation number perforations, analyzing and comparing the designation number perforations of said records and designation number indexes associated to address carriers, and printing upon agreement of said designation number perforations with said designation number indexes the address represented on said address carrier upon the corresponding perforated record to print upon the latter the address in addition to the numerical accounting data previously printed thereupon.

With the novel method the address carriers are brought at first in uninterrupted sequential order and are compared with the perforated records which are in the same order as the address carriers but the sequence of the records must not be necessarily uninterrupted and in most cases, in fact, the sequential order of the records is interrupted.

The ways and means for printing the numerical accounting data upon the records have already been indicated. Punching of the corresponding designation number perforation may be effected by a punching mechanism which may be of a known type and which may be either a separate machine or built in the adding, calculating or tabulating machine. If a separate punching machine is used, the novel method is preferably carried out in three separate steps: In the first step all records are provided with the numerical accounting data and a printed designation number in a suitable accounting machine; in the second step all records are punched with the corresponding designation according to the printed designation number, and in the third step the names and addresses are entered in the indicated way upon the records. If, however, the machine entering the numerical accounting data is provided with a punching mechanism, the numerical accounting data and the corresponding designation number perforation can be entered in the same operation; the method can then be carried out in two separate steps: at first the numerical data and simultaneously the designation perforations are entered upon the records until all records have been prepared in that way and then addressing of said records is effected in the second step. While the punching operation may be effected with various means, I have provided a novel punching device which is particularly useful in the present instance and which permits printing and punching of a record sheet while the same is fed over a feeding platen. I have further devised a tabulating machine permitting automatic punching operations in order to produce the designation perforations necessary on the printed records. Said automatic punching and printing record card controlled tabulating machine represents a preferred machine for carrying out the novel method, however, it will be understood that the novel method is by no means bound to said machine which will still be described herein in detail. The novel and patentable features of the same are, however, claimed in my co-pending applications Serial No. 543,599, filed June 11th, 1931, Serial No. 649,000 filed December 27th, 1932, and Serial No. 683,364, filed August 2nd, 1933.

Entering of the names and addresses upon the perforated records is effected by means of address carriers. The latter bear usually the name and address of the persons to whom they relate and preferably also a designation number; further on in the present specification I will speak only of the "address" which, according to the meaning of said term in connection with address carriers or address plates shall also include the name in addition to the address proper; on the other hand, of course, also carriers or plates bearing only the name without the address proper may be used in connection with the present invention and it will therefore be understood that the latter type of carriers is also considered to come within the term address carrier.

It is already well known to provide address carriers of various sort. For instance carriers in the form of stencil cards are known or carriers having the address embossed on tissue paper are in use from which the address is printed in a chemical way. It is also known to provide the address carrier in the form of a perforated address card the holes of which control an address printing mechanism. However, the preferred type of address carrier are the so called address plates consisting of sheet metal having the address embossed thereon. The address plates are fed through addressing machines and impressions are taken from the desired plates and for purposes of selection it is also customary to associate to the address plates indexes adapted to control the printing operation. On account of the advantages which the use of address plates as address carriers affords, the present invention is preferably carried out with address plates though it is by no means restricted to that type of address carriers.

According to the invention the indexes of the address carrier must be designation indexes; for said purpose holes or tabs or other indexes are arranged preferably immediately on the carrier or their frames, however, any other mediate means can be used. The present specification relates also to an addressing machine which is particularly well adapted for automatically comparing the perforated records and the address plates and which prints upon agreement the address upon the corresponding perforated record. However, also other types of printing machines may be used for the same purpose, i. e. for performing the addressing work on the perforated records. The novel and patentable features of the preferred addressing machine shown and described herein are claimed in my co-pending applications Serial No. 524,896, filed March 24th, 1931, and Serial No. 539,865, filed May 25th, 1931.

In the sort of bookkeeping work herein referred to there exist broadly two possibilities as regards the designation numbers in a series of records: In the one instance each designation number or designation perforation occurs only once in the series of records, no matter if there is a continuous or interrupted sequence in the order of designation numbers. In this instance therefore a selected address carrier must only be printed once; accordingly, in the novel method according to the invention after printing of an address carrier always the subsequent address carrier in the series of address carriers can be compared with the subsequent perforated record while upon disagreement between the record and the address carrier the same perforated record must be compared with the subsequent address carriers until agreement is detected. In another instance, however, it may occur that in a series of records the same designation perforation occurs several times. If records belonging to that group must be addressed, the same address carrier must be repeatedly compared after agreement and printing with the subsequent records until disagreement is detected while after disagreement the subsequent address carrier must be compared with the same perforated record compared in the preceeding comparison.

Since it is always known before if in a series of perforated records identical designations can occur several times or not, the first or second way indicated above may be used and if ever possible the first method should be applied since it permits a greater operating speed.

The novel method according to the invention includes also provisions for verification: Preferably together with the numerical accounting data also the corresponding designation number is printed upon the record. If then address carriers are used bearing also a designation number, the designation number will again be printed with the address and by comparing the two printed designation numbers it can be easily verified if the proper address has been printed to the numerical accounting data.

If records are prepared having linewise entries of numerical data, the corresponding designation number can be punched to each line of data and the address printed thereto.

However, it is also possible that a record comprise a group of linewise entries having the same designations; then the designation number is preferably punched only to one of said lines of each group and then the address is printed to said single line; this one line may be either the first line or the last line of said group of lines, for instance the first item of a group of items or the total line below said group of items.

If the novel method is carried out in connection with the perforated record card system, the record cards must indicate in addition to the numerical data only a designation number perforation and the same may control in the tabulating machine not only printing but also simultaneous punching of the designation numbers. The designation number perforations on said records are preferably produced according to the hole combinational system whereby the line spacing of the printed data need not or only very less be modified.

It will be understood that the records prepared according to the invention bear designation perforations; if desired, the perforated sections may be severed after addressing has been effected and then nothing on the record will indicate in which way the records have been prepared.

I will now explain the invention and preferred means for carrying out the same in connection with the accompanying drawings.

Figs. 1 and 2 illustrate portions of perforated record cards containing in the first field from the left a designation number such as the number of the customer of a coal mine, while the two record fields to the right thereof represent accounting data such as for instance the amount and the price of the delivered coal. The perforated numbers may, of course, also represent any other accounting data having any other meaning. For reasons of simplicity there are indicated on the cards only above and below each hole the numerals of the respective hole positions though usually all hole positions are indicated by printed numerals.

Fig. 3 represents a record sheet with linewise entries of items, and to each item the respective address is entered.

Fig. 4 represents a sheet similar to Fig. 3 in which, however, the various lines of accounting data represent totals instead of items as in Fig. 3.

Fig. 5 shows groupwise item statements with the total printed to each group; in this figure to each group of items the corresponding address is entered.

Fig. 6 shows also groupwise statements of items wherein the address is entered to each group, however, no totals are printed in these statements.

Figure 7:
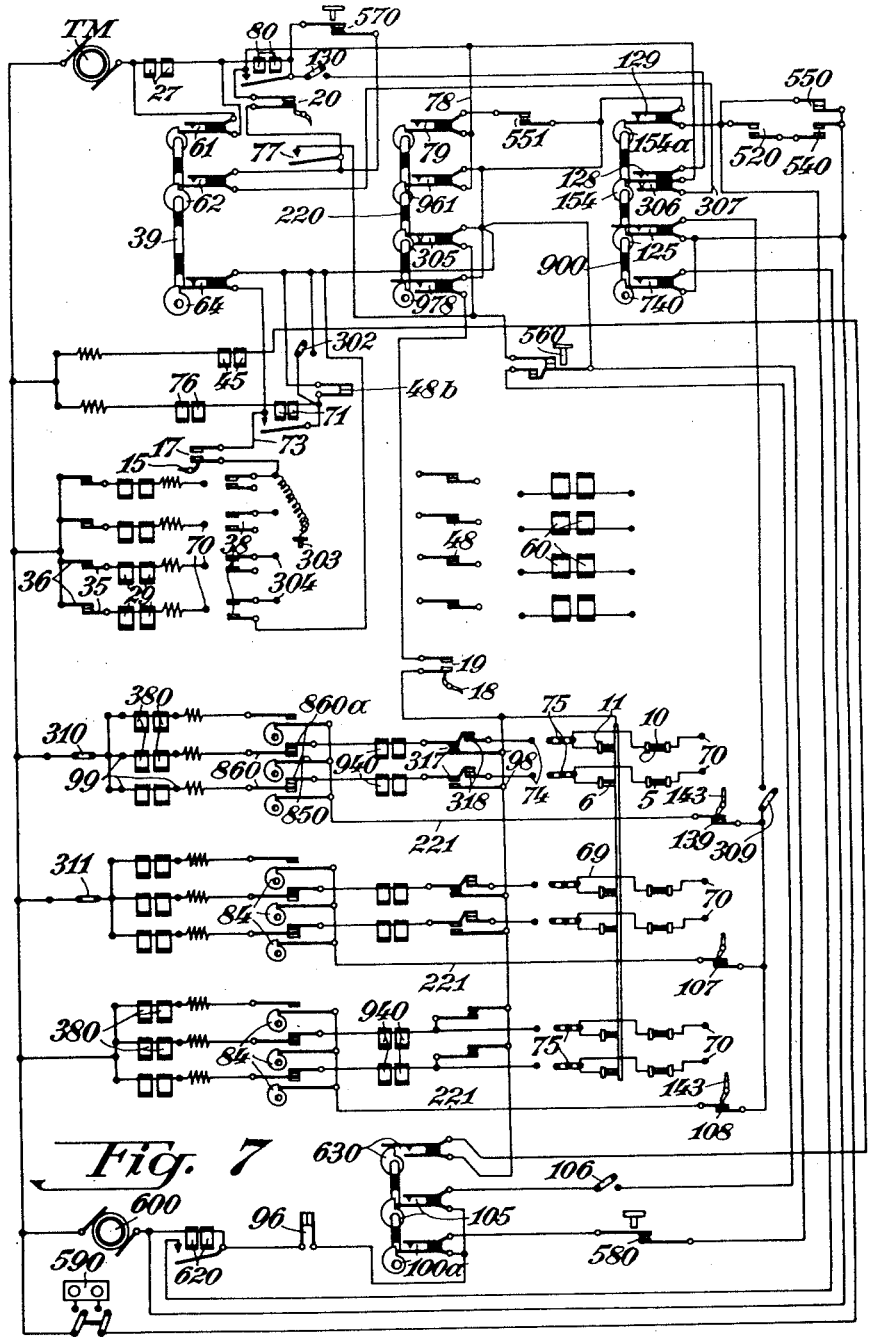

The record sheets shown may, of course, contain any desired number of adjacent vertical columns of numbers. In the record sheets shown in Figs. 2 to 6 the three numeral columns correspond to the three adjacent record fields of the cards shown in Figs. 1 and 2; accordingly, the first column contains the designation numbers while the second and third columns contains the numbers termed herein "numerical accounting data".

A printing and punching tabulating machine adapted to carry out the novel method according to the invention is shown in Figs. 7 to 16.

Fig. 7 shows the circuit diagram of an electrical tabulating machine having a punching mechanism.

Fig. 8 illustrates the known printing device of a tabulating machine.

Fig. 9 shows the known arrangement of an accumulator wheel which is under the control of a perforated record column of a card; upon rotation of the accumulator wheel a total number wheel is turned accordingly.

Fig. 10 is a section through the card analyzing mechanism of the machine.

Fig. 11 represents in an enlarged scale (as compared to Figs. 8–10) a section through the punching mechanism of the tabulating machine and shows the punch controlling means for a single record column.

Fig. 12 shows device for the automatic zero printing and zero perforation.

Fig. 13 shows the hole system according to which the different numerals are represented by different hole combinations.

Fig. 14 is a section through the perforating mechanism at the extreme left perforating place at which a guide hole for the designation perforations is produced.

Fig. 15 is a top view of the left end of the platen roller and of the perforating mechanism of the tabulating machine.

Fig. 16 shows the record sheet feeding mechanism of the machine, said mechanism being adjustable to feeding steps of different length.

An addressing machine adapted to address the record sheets after the same have been printed and perforated in the tabulating machine, is shown in Figs. 17a–22. Since said addressing machine represents an individual machine being entirely independent of the tabulating machine according to Figs. 7–16, in the drawings of the addressing machine reference numbers are used which are also used in connection with Figs. 7–16 which, however, designate different parts; the same reference numbers designate the same parts only within the Figs. 7–16 on the one hand and within the Figs. 17a–22 on the other hand since in both groups of figures there are shown two distinct machines.

Figs. 17a, 17b belong together and show a top view of the addressing machine used in connection with the present method.

Figs. 18a, 18b belong also together and represent a section through the machine shown in Figs. 17a and 17b.

Fig. 19 is a section on line 3—3 of Fig. 17b and shows the drive mechanism of the machine.

Fig. 20 shows in an enlarged scale the analyzing device for the index marks of the address plates, said marks being provided in the form of hole combinations.

Fig. 21 represents the scheme according to which the numerals in the sheets to be addressed and in the address plates are represented by different hole combinations; this key must, of course, agree with the key shown in Fig. 13 and for reasons of clarity the same key is also shown in connection with the addressing machine.

Fig. 22 shows the circuit diagram of the addressing machine.

The novel method of preparing statements by machinery will become quite clear if the method and the record sheets which may be obtained thereby are at first explained in connection with Figs. 1–6.

The data of the record cards as shown for example in Figs. 1 and 2 are computed in a tabulating machine such as for instance in a machine of the type still to be described; the various computing operations may be performed in a generally known way. It may be for instance desirable only to "list" (item printing), i. e. to print under the control of the perforations of the various cards automatically the data corresponding to said perforations line by line below each other. With this manner of operation no totals will be taken. In Fig. 3 there is shown a record sheet obtained in the above indicated way and showing in the first vertical number column the various designation numbers of a number of consecutive record cards while the two columns to the right thereof represent the accounting data coordinated to said designation numbers such as for instance the amount, the price and so on. To each item is entered at the left side of the record sheet a designation perforation according to the scheme in Fig. 13, the meaning of said perforation being in agreement with the designation number printed in the first number column. In order to obtain a standard point for determining the meaning of the holes of the hole combination there is provided in connection with each hole combination a so called guide hole 93' and it will be seen that near the left edge of the record sheet there is punched a series of guide holes below each other, each guide hole being coordinated to a designation perforation.

Under the control of the aforesaid designation perforations the addressing machine will then print in the manner still to be described to each item i. e. to each designation perforation the corresponding address. From Figs. 3 to 6 will also be seen that in addition to the addresses also the designation numbers are printed upon the sheet by means of the address plates, and by comparison of the designation number at the left side below the address and the designation number printed in the first vertical number column by the tabulating machine, the proper coordination of name and address to the accounting data may be easily verified.

Fig. 4 represents a record sheet prepared according to the invention; in said sheet the various accounting data represent totals and to each total the respective designation number is printed and perforated and subsequently the corresponding address has been entered to each total. Such total statements may be prepared with a tabulating machine still to be described in such a way that the data of the cards of each group of the groupwise ordered record cards are merely accumulated and the total of each group is printed under the control of the accumulator. The designation number is preferably entered into the accumulator from the first card of each group and upon total taking printing and perforating of the respective designation number will be simultaneously effected and subsequently the address can be entered under the control of the aforesaid designation numbers. In the statements according to Fig. 4 there is printed in each line in a generally known way an asterisk in order to characterize the accounting data as totals contrary to the accounting data in Fig. 3. which represent only items.

Fig. 5 represents a further record sheet obtained by the new method by means of a tabulating machine and an addressing machine. In this manner of application the cards are groupwise ordered according to the designation numbers and the various items are listed. Upon group change the total of the preceding group may be taken and printed, either under the control of stop cards between the various groups of cards or preferably under the automatic control of the record cards. In this instance the designation perforation is preferably entered to the first item of each group and under the control of said perforation the address is subsequently entered. In Fig. 5 the designation numbers are indicated in the first vertical number column and are entered to each item of a group while they are punched only to the first item of each group. It may, however, also be desirable to print in a similar way as shown in Fig. 6 the designation number only to the first item and to suppress designation number printing in all further items and then to print the total as in Fig. 5. Such possibility is provided according to the present invention and accordingly also lists may be obtained having total printings similar to those of Fig. 5 in which, however, printing of the designation numbers is suppressed after printing of the first item.

Fig. 6 illustrates another manner of application of the novel method; no total printing has been effected in this instance but the items are stated in groups and the address is printed to each group. The method is performed in such a way that upon group change only the first designation number of the subsequent group is automatically printed and simultaneously punched while these operations are suppressed upon the subsequent cards of the same group so that only the items in the two right hand vertical columns are printed. Under the control of the designation perforations the corresponding addresses will then be entered to each group by means of the addressing machine. The method with automatic group control and designation perforation to the first item of each group without total printing (Fig. 6) may, however, also be performed in such a way that not only to the first item but to each line of the group (similarly as in Fig. 5) the designation number is printed whereas the same is punched only to the first item and consequently the address will be entered only to the first item.

The addressing machine described herein may be adjusted to any one of two different manners of operation suitable for the novel method. It may occur that in a certain bookkeeping work each designation number occurs only once in the series of statements as this is for instance the case in daily statements of account because normally only one statement of account will be prepared for each account; or it may occur that a plurality of subsequent identical designation perforations are present as this is for instance the case if the various business transactions of a certain customer of a bank are listed below each other. Frequently there will be a plurality of business transactions in one day upon a certain account and in this case there will be in a statement similarly to that of Fig. 3 a plurality of designation numbers and perforations below each other. The addressing machine which may be used for performing the present method may be adapted to the last mentioned manner of operation in such a way that the same address will be printed several times if a plurality of consecutive identical designation perforations occur, or the machine may be adjusted to the other manner of operation and then the machine will operate with an increased speed, this manner of operation requiring, however, that each designation perforation occur only once in the series of designation perforations.

With the present novel method it is an essential requirement that the cards are previously brought in ordered sequence so that naturally in groupwise statements the cards of the same group will follow each other. The statements may be in uninterrupted sequential order; this is, however, not necessary for the proper performance of the present method and in most practical instances the statements follow in interrupted sequential order, as for instance in the preparation of statements of account where only for those accounts a statement of account must be prepared in which a business has been transacted since the last statement of account has been prepared. Accordingly, only a fraction of all accounts will have to be taken into consideration. For the proper performance of the addressing work, however, it is absolutely necessary that all address plates run through the addressing machine in uninterrupted order. The address plates are provided with designation number indexes such as for instance with perforations which are compared with the designation perforations of the record sheet and upon agreement the address plate will be printed upon the record sheet.

The arrangement of the numerical characters upon the record sheets (which are shown only for purposes of explanation) and upon the address plates as well as the scales in the tabulating machine and the illustrated addressing machine are slightly different. It is, of course, evident that the relation in the scales and the arrangement of the printed characters is of no material importance and of no influence whatsoever upon the present invention.

In connection with Figs. 7–16 a punching tabulating machine will now be described, said machine being adapted for the automatic preparation of the various before mentioned record sheets.

*Punching tabulating machine*

The Figs. 7 to 16 show in addition to the perforating mechanism more or less diagrammatically the essential parts of a known electrical tabulating machine in which the cards are fed through the machine one by one and are analyzed by analyzing brushes which in turn control the printing and accumulating mechanisms of the machine in accordance with the perforations of the cards. The accumulator is electromagnetically engaged in a known way and mechanically rotated, and the printing mechanism is reciprocating either horizontally or vertically and is provided with a number of type bars corresponding to the number of columns of the record card, said bars being upon item printing under the control of the cards or upon total printing under the control of the accumulator mechanism. Since the mechanical parts of such a machine are generally known and since such a machine is described in several patent letters (such as for instance in the United States Patent No. 1,600,413 and Reissue-Patent No. 16,304), the present specification will refer only to the most essential parts and the general operation of the machine will be described in connection with the circuit diagram.

The accumulator mechanism is shown diagrammatically in Fig. 9 in which the accumulator wheel is indicated at 82; said wheel is driven by a wheel 82' which may be engaged by means of a coupling linkage 81 with the continuously rotating drive shaft. The clutch linkage 81 is electromagnetically controlled by the accumulator magnet 940 (Fig. 7) of the respective record column, and will be disengaged at the end of the card passage so that the amount corresponding to the perforation will have been entered into the accumulator wheel 82. Simultaneously with the accumulator wheel 82 the cam wheel 84 is rotated by the drive wheel 82', and the height of the steps of said cam wheel corresponds to the adjustment of the accumulator wheel 82. The cam wheel 84 is analyzed by means of contact devices 850, 860 (Fig. 9) which in turn control the printing magnets 380 (Fig. 7) in accordance with the adjustment of the accumulator so that the respective total will be printed.

The printing mechanism may be under the control of the record cards for item printing as well as under the control of the aforesaid contact mechanism 850, 860 for total printing. The printing mechanism for one place (corresponding to one record column) is shown in Fig. 8. From this figure may be seen that the ends of a reciprocating lever 26 are connected by links 290 with a cross head 30 being movable along vertical bars 31 and receiving a vertical movement by the aforesaid lever 26. From the cross head 30 extend arms carrying a cross beam 32 passing through a number of slotted type bars 33; each type bar 33 carries on its head the type 34 being movable in vertical direction and corresponding to the ten numerals 0–9. The bars 33 are normally drawn upwardly by spiral springs 350 which are connected to levers 360; consequently the bars 33 are held in engagement with the cross beam 32 and will follow the upward movement of the latter which the same receives by lever 26 until they are arrested by the pawls 37 which are under the control of magnets 380, said pawls engaging into the notches 39 of the bars 33. The spacing of the notches 39 corresponds to the spacing of the movable type 34 and the movement of the bars 33 is effected under the influence of lever 26 in synchronism with the passage of a record card under the analyzing brushes; if therefore the brush encounters a hole, the coordinated magnet 380 will be energized and thereby the bar 33 will be arrested on a point of its upward movement at which the type corresponding to the perforation is in printing position and the bar will be held there until printing has been effected.

The cross head 30 has rearwardly extending projections with rollers 40 engaging into the slots of levers 41 which are pivotally mounted at 42; if the cross head rises said levers will be pressed rearwardly consequently to the slots and the cross beam 43 will therefore be moved to the left in engagement with the pivotally mounted spring actuated levers 44; the latter will be pressed rearwardly thus moving a number of spring actuated printing hammers 450 away from the type. At the end of the upward movement of the cross head 30, however, the bar 43 will be drawn downwardly and escapes from the ends of the levers 44; since the same are then all simultaneously released they will be drawn by their springs in clockwise direction so that the printing hammers will impel the selected type or an idle type of the type bar against the platen 85. Consequently, the type will print upon the record sheet 46 the numeral corresponding to the perforation.

For the suppression of zero printing in the places to the left of the highest numeral place and for automatic zero printing in the places to the right therefrom, there is a zero controlling mechanism provided which is shown more in detail in Figs. 8 and 12. This controlling mechanism comprises a lever 120 for each type carrier, said levers being pivotally mounted at 121.

Each lever has an arm 122 extending over the next lever to the left thereof. If the lower ends of the levers 120 catch into a notch 123 of the bars 33 the bars are permitted to move upwardly to a point where an idle type is in printing position; however, if the levers 120 do not engage into said slots the type bars are arrested by a projection 124 in a position being for one unit lower and in this position the type carriers will hold the zero type in printing position so that in all the respective places zeros will be printed. It will be seen that consequently to the superposition of the levers 120 in all places being to the right of the highest numeral place automatically zeros will be printed, in item as well as upon total printing (independently of the control of the type bars by the record cards or by the accumulator) in case there is no other numeral adjusted, and that in places being to the left of the highest numeral place the type bars will be moved to the highest position since in said places the arms 122 are permitted to move freely into the slots 123 so that in said places no printing will be effected at all.

Since the perforating mechanism may be used at will in connection with the printing tabulating machine, at first the operation of the tabulating machine without perforating mechanism shall be described on the circuit diagram and thereafter the perforating mechanism will be described as well as the insertion of its control magnets into the current circuits of the tabulating machine.

By depression of the start key at 570 (Fig. 7) the current circuit will be closed from the main line through the tabulator motor TM, and leading then over the clutch magnet 27, motor relay 80, start contact 570, motor control relay contacts 77, cam contact 305 (now being closed), cam contact 129 and contacts 550 to the other side of the current source. If only item printing is to be effected the same current circuit as has been mentioned before will be closed with the only exception that the current will then flow from the cam contacts 129 through the contacts 520 and 540 to the other side of the main line, and the machine is operated at a lower speed. It is to be mentioned that the cam contacts 61, 62, 64 are all controlled in unison by means of shaft 39 which rotates synchronously with the other parts of the machine. The cam contacts 305 are controlled by shaft 220 rotating synchronously with the shaft 39. The cam 154a for contact 129 is fast upon shaft 900 of the printing mechanism. Consequently, if only the accumulator mechanism is in operation and no item printing is effected, this shaft will be in rest position. It will only be operated upon total printing and resetting of the accumulators. The automatic group control mechanism comprises in the illustrated embodiment four group indicator contacts 48 and a contact 48b; another contact serves to control the control relay 71 and contact 48 serves to complete the current circuit if the accumulator is only to be used for group indicating without any automatic group control. The first of the last mentioned contacts energizes relay 71 if all contacts are closed, the relay remaining then closed under the influence of a cam controlled contact 64 as will still be described.

Card feeding is initiated either automatically or manually by the start key 570 and the cards start to run one by one through the machine as soon as the clutch magnet 27 connects the card feeding mechanism with the drive of the machine. If the cards run one by one through the machine nothing will happen until the first card comes under the lower brushes 6 and closes by means of card lever 18 (see Fig. 10) the contacts 19 and 20 after the contacts 17 have been closed before by the other card lever 15. If it is now assumed that only cards belonging all to the same group are running through the machine the controlling holes under the upper and lower brushes will pass at the same time under said brushes. This will establish a current circuit from a lower brush 6 to the contact block 11 and then through line 69 to the contact block 10 of the corresponding upper brush and from there to brush 5. The current circuit leads from the upper brush to the plug contact 70 of the plug board; for reasons of clarity the plug connections which are normally to be made are not shown in the diagram. The current may then flow through one of the control magnets 29 back to the current source; the energized control magnet interrupts the contacts 35, 36 to take the spark from the brushes and simultaneously the contacts 38 will be closed which complete a part of the shunt circuit including the control relay 71. The same operations will take place during the passage of the remaining record columns at the brushes being inserted into the group controlling circuit so that the shunt circuit will be completed. During the machine cycle the cam contacts 64 are instantaneously opened which has, however, no effect upon the relay 71 since the current circuit 73 is still closed by contacts 38 while in the other case the current circuit of the relay would be interrupted. The plug 303 may be inserted into any one of the contacts 304 in order to exclude one or a plurality of control circuits if less than the total number of the existing group control units are required.

At the end of the passage of the first card under the lower brushes the cam controlled contacts 630 will be closed thereby causing a current impulse through the group indicator magnet 45 which releases a lever not shown in the drawings and permits a bar to open all contacts 48 as long as the card run through the machine is not interrupted so that said contacts will remain open. It is still to be mentioned that the group indicator contacts 48 are inserted between the points 74 and 75 to prevent entering of group data of the following cards into the accumulator after the group number has once been entered into the accumulator from the first card.

From the foregoing it will be seen that the group controlling circuit remains closed as long as subsequent cards are in agreement and consequently the machine will continue in its operations. If it is now assumed that the last card of a group has passed under the upper brushes and is about to come under the lower brushes, the first card of the following group will be under the upper brushes; since both cards are provided with different group numbers the aforesaid controlling circuit will be interrupted between the upper brushes 5 and block 10 thereby interrupting also the current circuit 69 and preventing energization of magnets 29. Consequently, the contact 38 and the current circuit 73 will remain open so that upon opening of contacts 64 the relay 70 71 will be deenergized and will interrupt the current circuit of motor relay 76, thereby opening the contacts 77. These contacts are in shunt to the circuit 78 and are inserted in mere tabulating operations (only accumulating and total printing)

over cam contacts 961 and upon total printing over cam contacts 79; said contacts open at the end of the machine cycle and consequently the motor relay 80 and also clutch magnet 27 will be deenergized so that the machine will be stopped.

If total taking is to be effected manually, the switch 106 (as shown in the drawings) must be opened and the reset key 580 must be depressed. Then a current will flow from the current source 590 through contacts 550 (in tabulating operations) or contacts 540, 520 (upon item printing), then through contacts 129 now being closed, through the various lines to the reset key 580, the contacts 100a now closing, the clutch magnet controlled contacts 96, reset magnet 620, reset motor 600 to the other side of the main line and back to the current source. The cam contacts 100a, 105 and 630 are provided upon a shaft rotating synchronously with the shafts 39 and 220. The reset motor 600 causes printing of the total and resetting of the selected accumulators as is usual in tabulating machines. After total taking and resetting has been initiated by the reset key 580, the current is taken over from the reset motor by a relay controlled magnet 620 short circuiting the reset key 580. After total taking and resetting, the magnet 620 will be short circuited. The control of the printing and resetting motor is governed by contacts 740 being provided upon shaft 900 rotating once during the printing and resetting cycle. Said contacts open at the end of the printing and resetting cycle the current circuit of the motor 600 and prevent thereby further rotation of the same. The means to take at first the total and then reset the accumulators are controlled by magnet 620 as is explained in prior patents. It is still to be mentioned that the contacts 96 prevent printing and resetting if the tabulating motor TM is running and has energized the clutch magnet which opens the contacts 96.

If the total is to be taken automatically the switch 106 must be closed. Then the contacts 105 which initiate printing and resetting will be closed (just before the machine is stopped automatically under the control of the group control mechanism) and printing and resetting will then be effected in the above described way. The current circuit of the switch 106 extends over the contacts which are under the control of stop key 560; if therefore said contacts are open total taking cannot be automatically initiated.

After a total has been taken either automatically or by key actuation, restarting of the machine for the next card group may be effected either automatically or manually. For the manual release only the start key 570 must be depressed thereby initiating another machine cycle as has been described. In order to effect an automatic restart of the machine the total switch 130 must have been closed before. Over said switch another start circuit will be closed as follows: From the current source 590 through tabulating motor TM, clutch magnet 27, motor relay 80, switch 130, cam contacts 128 being closed at the end of the printing and resetting cycle by the cam 154, around motor relay 80, through the lower card lever contact 20 (now being closed since there are cards in the machine), through motor relay controlled contacts 77 (now being closed) then either through cam contact 305 or interrupter contacts to the cam contacts 129 (now being closed), through one of the contacts 550 or 520/540 to the other side of the line and back to the current source. Said current circuit will automatically initiate another machine cycle. The machine will then continue in its operations since the contacts of motor relay 80 remain closed until they are opened again at the end of the next card group under the influence of the automatic group control mechanism, whereupon total taking, resetting and restarting of the machine may again be initiated in any one of the above described ways.

If the card supply is exhausted, accumulation of the data of the last card will be completed in the known way and then total taking will be effected; this, however, needs no further explanation in connection with the present invention since the respective operations are described in the above mentioned prior patents. The cam contacts 630 serve to release the current impulse to the group indicator magnets 45 at the proper moment in the machine cycle. The cam contacts 125 serve for the control of the current supply to the current circuits 221 leading to the total taking contacts 850 and 860 which are controlled in the known way by the cam disks 84; the printing magnets 380 are in series with the contacts 860.

To control printing of the total from any one of the accumulators at will, there are provided three contacts 108, 107 and 139 which are controlled by levers 143. If said contacts are open the printing current circuits of the coordinated accumulators will be interrupted thereby preventing total taking. If it is desirable to switch off simultaneously all total taking magnets the switch 309 can be opened thereby interrupting the current circuit of the cam contacts 125. In the present embodiment the printing magnets are permanently in series with the accumulator magnets 940 and if a controlling impulse is released both magnets will be energized simultaneously. The adjustment of the machine either for item printing and accumulation or accumulation only may be controlled by a special lever which controls also the drive mechanism of the machine. This mechanism as well as further details are, however, clearly described in the prior patents so that no further explanation is necessary in the present specification.

The switch 302 shown in the diagram serves to close a current circuit which prevents in any way automatic group control; this is desired if the machine shall only accumulate the data or if only item printing shall be effected independently of the group designations of the cards.

The switches 310 and 311 serve to permit tabulation if they are closed; if the switch 302 is closed the automatic group control mechanism is switched off. If the switch 302 is open as illustrated and switch 310 is closed, group control will be effected in the record columns coordinated to the accumulator as far as corresponding switch connections have been made.

In a printing tabulating machine the accumulator wheels control total taking while item printing is effected by record cards. The accumulator magnets 940 which are energized by the holes and which are adapted to engage the accumulator wheels close a shunt circuit about the brushes over the contacts 317. This is for a double purpose, on the one hand to take the spark from the lower brush 6, and on the other hand to maintain the current circuit through the accumulator magnet 940 and the printing magnet 380. If now the automatic group control is used the same devices are used. By energization of the magnets 940 the main current circuit of the brushes will be interrupted by contacts 318, and simultaneously the shunt circuit will be established through contacts 317. Consequently to the interruption of the contacts 318 back circuits through the holes of the upper card are prevented.

To the contacts 108, 107 and 139 for the selective control of total printing from the various accumulators are bell crank levers 143 coordinated; said levers are under the control of the reset clutches as has been described in the above mentioned prior patents. If the reset clutch of any accumulator is moved to the left, resetting of the corresponding accumulator will be prevented by simultaneously opening the coordinated contact 108, 107 or 139, and accordingly also total taking from the respective accumulator which is not reset will be prevented. If on the other hand the clutch member is adjusted in the right hand position, the accumulator will be reset and the corresponding switch will be closed so that also a total will be taken from said accumulator. In the generally known way provision may also be made to take a total without resetting the accumulator.

Now, reference will still be had to a few general operations of the machine: If the machine is to be used only for mere accumulating (without printing any items) the tabulator will operate in the usual way with a higher speed, and by means of the shiftable speed mechanism the contacts 520/540 will be opened. At the same time, the operator of the machine will open the switch 309 which prevents total printing. The machine may then operate as ordinary computing machine and the printing mechanism will be idle during the accumulation. Upon resetting, the printing mechanism will perform one cycle, but since the total taking circuits are not closed no printing will be effected.

It is desirable to accumulate the data of each card group and to print the total of each group, the switch 309 must be closed so that total printing at the end of each card group will be permitted. During such accumulating operations, item printing will be entirely suppressed and during the printing operations only the total of the previously accumulated items and the coordinated group member will be printed.

The above described manner of operation may be performed either full- or semi-automatically. So for instance the data of a stack of cards may be accumulated and if the switch 302 for the automatic group control is open the accumulation will be automatically interrupted if the card group changes. Total taking may then be initiated manually by depressing the key 580 or automatically (if the switch 106 has been previously closed). After total taking (either automatically or manually) the tabulating machine may be restarted either automatically or manually. In the latter case it is only necessary to depress the start key 570 while in order to cause automatic restart the switch 130 must have been closed. If said switch is in closed position the initiation of another machine cycle will be automatically effected by the cam contact devices.

If it is desirable to print items, the printing mechanism is rendered operative through the printing lever as has been described in the prior patents. Simultaneously therewith the speed control mechanism will be shifted so that the corresponding contacts will be opened and this will cause operation of the tabulator with a lower speed. It is then possible to print the various items and to accumulate the same as well as to print the respective totals. It will be seen that the group numbers serve for the control of the operation of the machine and also for the control of total taking and that in the described embodiment they are not entered into the accumulator from each card; the group number is printed adjacent the first item and then no further printing will take place until the total is taken when the group number will again be printed adjacent the total. The group number may, however, also be printed to each individual item, but then the group indicator contacts 48 are not inserted into the analyzing circuit; with this manner of operation the group number will not be printed together with the total.

The perforating mechanism which is provided in the tabulating machine, comprises a number of perforation units, one unit being provided for each record column to be punched as is for instance shown in Fig. 11. From Figs. 11 and 15 may be seen that at the one end (preferably at the left end) of the printing roller 85 there is a groove provided in said roller in which a matrix block 91 is located; the latter is rigidly connected to a holder 87 in such a way that the inner stump of the platen is permitted to revolve freely in the boring between 91 and 87. The holder 87 is rigidly connected by a bar 88 with a plate 90 being connected to the bearing 170 of the platen; to the plate 90 is fastened also the punch carrier 23. It will be seen that the record sheet 46 is free to move between the punch carrier 23 and the matrix block 91. Through the punch carrier 23 passes a guide bar of the guide rollers 89 for the record sheet and similar guide rollers are provided above and below the platen at both sides of the punching mechanism so that the record sheet is fed safely by the rotating platen between the fixed matrix block 91 and the punch carrier. The matrix block 91 has a hollow space 92 extending axially to the platen over all rows of punching stamps and terminating into a pipe 92' being preferably connected to an exhaust line operated by a ventilator or the like in order to remove the waste from the space 92. The punch carrier 23 comprises for each record column four resiliently mounted punching stamps 93 being symmetrically arranged above and below the printing line and being normally held by a cover plate 94 in the position shown in the drawings. The punching stamps 93 are slotted at their outer ends and into said slots engage pivotally mounted levers 95 being connected with slides 96 which extend through the guide plate 25 of the punching stamp case 24 to the outside of said plate. The distance of the slides 96 from each other corresponds exactly to the distance of the notches 39 of the punching stamp carrier bar 33', 51, 52 and the notches 39 in turn correspond exactly to the similar notches of the type bar shown in Fig. 8. In order to represent a certain numeral the punching stamps 93 are depressed by means of the slides 96 either singly or in different combinations in order to punch a hole combination into the record sheet 46. The selection of the punching stamps is effected in accordance with the numeral to be punched in a similar way as the selection of the printing type in Fig. 8. For each record column there is a notched bar 33' provided which is drawn upwardly by means of spring 350 in a similar way as the type bar of the printing mechanism in Fig. 8; each punch bar may be arrested in different positions by the pawl 37 under the control of the selector magnet 60. The bar 33' is connected with the bar 52 by a cross piece 51 and the bar 52 carries four resiliently mounted pins 53 which are spaced as shown in the drawings. If the bar 52, 33' is in the lowermost position, the uppermost pin 53 is just for one tooth 39 below the lowermost slide 96, and if the bar 52 is in its uppermost position (the lowermost and uppermost positions are indicated by dotted lines) the lowermost pin 53 is for one tooth 39 above the uppermost slide 96. In all intermediate positions, however, one or a plurality of the pins 53 will be adjusted opposite the slides 96 and if then in the way still to be described the plate 58 is moved to the right, the selected punching stamp or punching stamps 93 respectively will be pressed under the control of the pins 53 and the slides 96, 95 through the record sheet 46, and upon return movement of the plate 58 the punches will also return under the influence of their springs to their home position. The perforation scheme with respect to the various positions of the bar 33 may be clearly seen from Fig. 13 and may be verified on Fig. 11; in said Fig. 11 is the punching bar so adjusted that the numeral "5" will be punched, in accordance with Fig. 8 in which the type "5" is in printing position. For reasons of clarity it is still to be mentioned that the hole positions pass in the sequence of 9 to 0 under the brush and that consequently also the type and punching stamp bars rise in the same sequence from the lowermost to the uppermost position through the various numerical positions. The adjustment of the selector bar 33' is effected by the selector magnet 60. During the machine cycle the type bars 30 (Fig. 8) and simultaneously therewith also the punching bars 33' are raised by the same mechanism which has been previously described. At the end of the machine cycle, and in the same moment in which in the printing mechanism the type hammers are impelled towards the record sheet, the peaks of two cams 56 rotating once during each machine cycle will encounter the fingers 57 of a frame 58 being guided upon pins of the casing, said frame being normally held by springs 55 in engagement with the cam disks 56. The peaks of the cams 56 will move the frame 58 and the pins 53 lying just opposite said frame to the right, and consequently also the slides 96 and levers 95 will be moved far enough to press the corresponding punching stamps 93 through the record sheet 46 while all other punching stamps, i. e. those punching stamps to which no pins 53 are coordinated between their slides 96 and the plate 58 will be inoperative and no perforation will be caused thereby. After perforation has been effected and printing has taken place in the previously described way, all parts will return to their home position and consequently also the punching bars 52, 33' will return under the influence of the cross head 30 to their home position.

Controlling of zero punching upon item perforation as well as upon perforation of a number under the control of the accumulator is effected (in a similar way as has been already explained in connection with the type bar) by means of a pivotally mounted lever 120 encountering either a recess 123 or a projection 124. Consequently, in all places being to the right of the highest numerical place the zeros will be automatically punched while in all places to the left thereof the bars 52 will raise for one unit higher so that the lowermost pin 53 moves beyond the uppermost slide 96 and consequently no perforation will be effected at all in the respective punching column.

The distance of the perforation from the side edge of the record sheet determines the denominational value of said perforation; however, the meaning of the perforation is not yet unequivocally determined. For this purpose there is a special guide hole punching stamp provided which produces each time a record perforation is effected a hole on the same predetermined position which hole is invariably at the level of the lowermost hole position of the record perforation and which is therefore adapted to determine the meaning of the hole combinational records. The device for producing the guide hole may be seen from Figs. 11 and 17. On opposite side walls of the casing are two bell crank levers 160 (in the drawings is only the lever lying on the one side shown) pivotally mounted which are connected with one another by a cross bar 161 which is normally drawn by a spring 163 against the left edge of the bars 52. Each bar 52 has a recess 54 which is just opposite the yoke 161 if the bar 52 is in its uppermost position (i. e. for one step above the zero position). The recesses 54 of all perforation bars 52 will therefore be just opposite the yoke 161 if all bars 52 are in their uppermost position, i. e. if no record perforation will be effected at all. In this instance the spring 163 will draw the yoke 161 into the recesses 54 and consequently the bell crank levers 160 will be rocked so that also (see Fig. 14) the arm 162 will be drawn downwardly and the arm 164 connected therewith by a pin and slot connection will be moved downwardly. Said arm 164 as well as the arm 162 are, of course, to the left of the extreme left punching column; the arm 164 is pivotally connected with the punching plate 58 and lies normally opposite of a slide 166 adapted to cooperate with the guide hole punching stamp 167.

The cams 56 rotate, of course, only during printing cycles so that only then a perforation will be effected provided the bars 52 are adjusted in punching position. If now for instance in connection with total taking no perforation shall be effected the selector magnets 60 will not be energized and all bars 52 will raise to their uppermost position so that in each of such cycles the arm 164 (Fig. 14) is rocked lower than the slide 166; consequently, if the bars 52 are in their uppermost position there will be neither a record perforation nor a guide hole perforation effected; however, if through one or a plurality of the bars 52 a record perforation is effected, the lever 160 is prevented from rocking in a clockwise direction so that simultaneously with each movement of the plate 58 to effect a record perforation also a guide hole will be punched.

As will still be explained, with group accounts and printing of each individual item, the group designations are usually punched only to the first item of each group so that in such accounts the space required for the perforations needs no particular consideration since said group accounts require in any way a longer record sheet as is required for the perforation. However, if only totals are to be printed or if a perforation shall be entered to each item the record sheet must receive larger feed steps since the perforation requires a larger space in vertical direction than the printing line. The device serving for this purpose is shown in Fig. 16 showing the device adjusted for normal linewise type printing. The lever 156 having a projection 155 is raised synchronously with the printing mechanism, rocking thereby a lever 152 which is pivotally mounted at 153 and which engages with its pin 151 into a slot 150 of a lever 148 pivotally mounted upon the shaft 86 of the printing platen and being normally drawn upwardly by a strong spring 149. At the left end of the lever 148 is a shift pawl 144 pivotally mounted engaging with a sidewardly extending projection into the teeth of the ratchet wheel 147 being fast to the platen roller and being held in its position by the bell crank lever 146. If the lever 148 is rocked in clockwise direction consequently to the raising bar 156 (turning thereby the pawl 144 for the amount of three teeth) the roller 145 of the shift pawl 144 will encounter a plate 140 and will thereby be moved out of engagement with the ratchet wheel. Upon the return movement of the arm 156 the pawl 144 will be moved downwardly under the influence of spring 149; however, the roller 145 will slide upon the plate 140 long enough so that the shift pawl will skip two teeth and will engage only the third tooth thereby effecting a shift step corresponding only to the length of one tooth which corresponds just to the normal distance between two printing lines. This adjustment of the record sheet feed mechanism is for instance used in connection with the above mentioned group accounts. However, if a perforation has to be effected to each printing line the plate 140 is adjusted in the position shown in Fig. 16 in dotted lines and is secured by means of the set screw 141. The pawl 144 will then be in engagement with the ratchet wheel during the whole backward stroke of the lever 148 and consequently the pawl will rotate the platen for three teeth thereby effecting a sufficient distance between the various record lines and providing a suitable blank space between the various perforations coordinated to the printed lines.

Now the various manners of operation in connection with perforation shall be described on hand of the circuit diagram of Fig 7.

If it is desirable to punch to each item the designation represented in a certain card field of the record card, such as for instance the account number, the selector magnets 60 are inserted immediately between the plug contacts 74 and 75 so that the magnets are from the analyzing brushes 11 immediately in series with the accumulator magnets 940 and the printing magnets 380. The selector bars of the punching mechanism are locked in a mechanical way after instantaneous energization of the magnets 60 while the printing and accumulator magnets are included over the contact 317 into a shunt circuit. Since the records to be perforated are usually group indications or other designations, total punching will usually not be effected; however, the total may be taken from the accumulators and punched in the above described way without difficulty. In this case, the selection and adjustment of the various switches of the tabulating machine must be effected in the known way for "item printing" so that the various items will be printed and a perforation will be entered to each item in the above described way, said perforation corresponding to the perforation of the record field selected for said purpose, with the only difference that the respective number is represented upon the card according to the single hole system while the perforation upon the record sheet is effected according to the hole combinational system; it will, of course, be understood that the invention is independent of the system of perforation.

If group accounts are to be made by means of the automatic group control mechanism it may be desirable to punch the group number or designation to the first item of each group but to suppress the perforation for each following item of the same group. Further, it may be desirable to print to the first item (in addition to the perforation) the group number as well as to all other items, or to print said group number only to the first item. In the latter instance (i. e. that the group number is to be punched and printed only in connection with the first item) the magnets 60 and the group indicator contacts 48 must be inserted between the plugs 74 and 75, the magnets 60 lying in series with the contacts 48. After the passage of the first card the selector magnets 60 and the printing magnets are switched off from the analyzing brushes due to the interruption of the contacts 48, after the group number has been entered into the accumulator by means of magnets 940. With the following items there will be no printing of the group number and also no perforation of the same, and only upon total taking the group number which has been entered into the accumulator will again be printed by the printing magnets but it will not be punched in the present instance. If it is desirable to print the group number to each item and to punch, however, said number only to the first item of each group, the magnets 60 and contacts 48 are switched in series between the plug contacts 98 and 75. This will cause that after the passage of the first card consequently to the interruption of the group indicator contacts 48 the magnets 60 will be switched off from the current circuit, and consequently no perforation can be effected during the following items. Simultaneously with the aforesaid switch connection, however, also a direct connection must be made between the contacts 74 and 75 so that the group numbers are entered each time into the printing mechanism and are printed to each item, Also in this instance the group number will normally not be printed together with the total.

Another manner of operation consists therein that all items are only accumulated (but not printed) and then only the total of each group of items may be printed. In this instance it may be desirable that the group number be also punched to the total and, if desirable, the group number may also be printed. For this purpose the magnets 60 are connected parallelly to the printing magnets 380 directly to the plug contacts 99; the group indicator contacts 48 are switched between the plug contacts 74 and 75 so that the group number of the first card is entered into the accumulator and remains adjusted in the same. During the following accumulation of the data of the subsequent cards of a group the printing mechanism will not be actuated, and if then upon total taking the printing magnets 380 are energized in accordance with the adjustment of the accumulator, the parallelly arranged selector magnets 60 will be energized simultaneously with the magnets controlling printing of the group indication so that the group number will be perforated as well as printed. If it should be desirable to punch the group number without printing the same, it is only necessary to exclude the magnets 380 and insert in place thereof the selector magnets 60. Punching of the group number in totalling operations is, of course, not restricted to the above described ways. It is also possible, as in known tabulating machines, to print the group number under the immediate control of the first card and to punch the same, and then entering the total after completion of the group accumulation. If this manner of operation is chosen it is only necessary to switch the magnets 60 and contacts 48 in series between the plugs 74 and 75.

By means of the above described machine, of course, group accounts of the described kind may also be made without printing the total to each group. For this purpose the group control mechanism is rendered operative and the total taking switches are opened so that only the items of each group will be printed. As has been mentioned above in connection with total printing in group accounts, it is also possible in preparing group accounts without total printing, to punch the group number to the first item of each group and to print the same in addition to said perforation either only to the first item or to all items of the respective group.

The record sheets having now been prepared in the tabulating machine with the numerical designation and accounting data and punched with the designation number are now automatically provided with the address in an addressing machine. An embodiment of an addressing machine in which the record sheets may be subsequently addressed will now be described in connection with Figs. 17a–22.

This machine operates full-automatically but it is quite evident that also a manually actuated machine may be used.

ADDRESSING MACHINE

*Address plates and record sheets to be addressed*

The address plates (Figs. 17a, 17b, 18a, 18b) are fed from the magazine 10 through the machine to the receptacle 12. Each plate is provided with a perforation representing the plate number and said perforation is arranged in accordance with the key shown in Fig. 5. This perforation may, of course, be replaced by tabs or may be provided upon a card inserted in a frame carrying the address plate. The record sheets to be addressed may be in the form of lists and are perforated in accordance with the same key as the address plates; each record column comprises four hole positions within which a numeral may be represented by a single or combinational holes. The lists are also provided with a guide hole provided at the level of the lowermost hole position of a hole combination.

*Driving mechanism of the addressing machine*

The machine is driven by the motor 15 (Fig. 19) through the worm 16. The plates 11 are fed by a slide 18 (Figs. 18b, 19) from the right to the left through the machine. The slide 18 is actuated by means of parts 59, 62, 61 by a lever 57 being under the influence of a spring 58; said lever is pivotally mounted at 56 and is rocked about its pivot under the control of a cam disk 54 upon which the roller 55 rides. The cam disk 54 is driven by means of gears 52, 53 and the one-revolution clutch 49, 50 provided upon the shafts 48, 60, said one-revolution clutch being controllable by magnet 63 by means of a pin 51 and lever 64 coacting with a spring 65. The shaft of the disk 54 carries a cam 134' closing in the home position of said disk a contact 134. The shaft 48 is driven by worm 16 through wormgear 47. The one-revolution clutch 37, 38 (Fig. 18b) for the printing mechanism is controlled by means of parts 45, 39, 40 by the magnet 41. The shaft 36 of the clutch member 37 is driven by worm 16 through the wormgear 35. The lever 40 has a downwardly extending member 65, which, as will still be described, is adapted to control the clutch member 64 of the one-revolution clutch 49, 50 for the plate feed mechanism. In the front and rear wall of the casing is a shaft 196 mounted adapted to be adjusted into any one of two shift positions; the shaft is provided with a spring actuated pin 195, engaging in the one shift position of the shaft between the arms 65 and 64. Upon the shaft 196 is fastened on the outside of the machine (Fig. 17b) a handle 192. If the parts are in the position shown in Figs. 17b and 18b the arm 65 will freely move upon energization of the magnet 41 and no influence upon the arm 64 will be effected. The handle 192 must be adjusted in this position if the mechanism shall be adapted to print the same address upon a number of subsequent lists having identical designation perforations. However, if the machine shall be shifted to the other manner of operation (if each designation perforation occurs only once in the series of record sheets) the lever 192 must be turned for one fourth revolution in clockwise direction so that the pin 195 will move between the arms 64 and 65. Accordingly, upon each energization of magnet 41, also the one-revolution clutch 49, 50 for the plate feed mechanism will be released by means of pin 195 which will be moved to the right by arm 65 so that simultaneously with or after each printing operation respectively also the next record sheet will be immediately advanced.

The printing cushion 18 is fast on the plate 19 (Figs. 17a, 18a) which is connected by means of parts 20, 21, 22 to the arm 23 which is integral with sleeve 25 and arm 26, the roller 27 of which is riding under the influence of spring 28 upon the cam disk 29; the cam disk can be driven over shaft 30 and bevel gears 31, 32 and shaft 33 by means of the one-revolution clutch 37, 38 to perform one printing cycle. Upon the shaft 33 are fast two cams 131' and 132'; the first cam closes after completion of the printing operation temporarily the contact 131 and the last mentioned cam keeps the contact 132 closed if the machine is in home position. The sleeve 25 is pivotally mounted upon the shaft 24 which is fastened to the bracket 25'. The address plates are advanced in the channel 17 (see Fig. 18b) and by means of a ribbon 19 (Fig. 18a) they are printed upon the lower side of the record sheet which is fed between the printing cushion 18' and the ribbon 19'.

The record sheets are inserted by means of hand wheels 72 and 73' and are fed by rollers 70 and 71 (the first ones operating as drive rollers) over the table 190 of the addressing machine thereby closing the contact 137 (Fig. 22) which is under the control of a lever 136. The feed of the sheet is effected by means of a clutch 74, 75 (Figs. 17b, 19), said clutch is driven by a wheel 73 through worm 16 and is operatively connected through gears 76 and 77 with the feed rollers 70. The clutch is under the control of the magnet 78 controlling the clutch mechanism 79—83 which on its part closes upon energization of magnet 78a contact 84. Upon energization of magnet 130 a frame 128, pivotally mounted at 129, will be rocked; the fingers 126', 127' of said frame are adapted to close the contacts 126 and 127 under the control of the spindle 16.

Comparing mechanism for record sheet perforations and address plate perforations All hole positions of a record list and of an address plate are simultaneously analyzed and the two current circuits coordinated to each hole position control two oppositely acting windings of an electromagnet so that upon agreement said windings will be compensated and no controlling effect will be caused thereby while in the other instance a controlling operation will be effected. The respective magnets which are indicated in Fig. 19 at 120, control the plate 132 which is pivotally mounted at 121 and which normally keeps the contact 124 closed under the influence of a spring 123; upon energization of one or a plurality of the magnets 120, however, the contact 125 will be closed.

The analysis of the record sheet perforations is effected by means of the analyzing brushes 90 (Figs. 17a and 17b); for each record column there are four brushes provided in a vertical row. The guide hole of each list is analyzed by the brush 95. The brushes 90, 95 cooperate with a contact plate 94 and are fastened on an insulating block 91 being adjustable along the adjusting bar 93 by means of the set screw 92.

The analyzing mechanism for the address plate perforations is shown more in detail in Fig. 20, illustrating the arrangement for one record column. The pins 101 for the analysis of the address plate perforations are slidable in a plate 100 and are guided by the inner ends of levers 102 which are pivotally mounted at 103 and which are under the influence of springs 112. The levers 102 are held by means of springs 106 and a frame 104 in their lower position through a cross bar 105 and are only released for analysis if due to the energization of magnet 109 the core and accordingly also the pin 11 and the frame 104 are raised, and at the end of said movement the contact 135 will be closed. On each position on which there is a perforation in the address plate the contact 107 coordinated to the respective hole position will be closed.

Circuit diagram

The current source 138 (Fig. 22) may be connected by the main switch to the main lines 139 and 140 to which the motor 15 is directly connected. From the contact 137 leads over stop contact 141 a line 142 terminating in contact 127 which again is connected by line 143 to the middle plate spring of the shiftable contact 124, 125. From the right side of the contact 124 leads a line 144 to the clutch magnet (for the printing mechanism) which is connected to the main line 140. The left side of the normally open contact 125 is connected by a line 145 with the clutch magnet 63 (for plate feeding) which in turn is also connected to the line 140.

The analyzing and comparing mechanism is inserted into the current circuit as will now be described: As will be seen from the circuit diagram, each magnet 120 comprises two windings. In the circuit of the one winding of each magnet lies the contact of the coordinated brush 90 with the contact plate 94 while the circuit of the other winding is controlled by the contact 107 (see also Fig. 20). The plate 94 is connected by a line 148 with line 142 and the brushes 90 are connected by lines 149 with the one ends of their coordinated windings. The terminals of said windings are connected by common lines 150, both upper lines 150 leading to a common line 151 and both lower lines 150 leading to a common line 152. The lines 151 and 152 are connected to a common line 153 leading to the contact 126 which in turn is connected over line 154 with the lower main line 140. The address plate controlled magnet windings of both upper sets of magnets are connected by lines 156 and 157 directly to the upper line 142 while the corresponding entries of both lower sets are over line 158 in connection with line 142. The terminals of said windings in which the contacts 107 are arranged are connected as shown in Fig. 22 by common lines to the lines 151 and 152 which are connected to the line 153. It will be seen that from the positive pole (line 142), over line 148, contact plate 94 and brushes 90 the list perforation controlled magnet windings are connected over line 153, contact 126 and line 154 with the negative pole (line 140) of the current source; on the other hand, the address plate perforation controlled windings of the magnets 120 are connected with their entries by lines 156, 157 and 158 to the positive pole (142) while their terminal lines in which the contacts 107 are arranged are connected with line 153 leading in the above described way to the negative side (140) of the current source. Accordingly, the comparing magnets 120 are controlled by the sheet perforations as well as by the perforations of the address plate in such a way that these perforations control closure of the contacts 90, 94 and 107 respectively; if these contacts are closed, no current circuit is yet established since the completion of the current circuit is controlled by contact 126 arranged in the common back line of all magnets; it is only if the circuits of the magnets have been prepared by the perforations of the list as well as by the perforations of the address plate that by closure of contact 126 the comparing circuit may be finally completed so that the windings of the magnets 120 may be energized.

To the line 142 is the magnet 130 connected which in turn is connected by a line 162 over contact 135 with the line 140 so that the magnet 130 will be energized if due to the energization of the solenoid 109 the contact 135 is closed.

For the control of the paper feed, the brush 95 cooperating with the contact plate 94, is connected by line 163 with the relay 164 which in turn is connected over line 165 to line 140.

The armature 166 of relay 164 establishes in the deenergized state of the relay a connection between the line 165 and the line 167 leading to the contact 84; however, if the relay 164 is energized its armature closes the contact 168 thereby connecting the line 169 with the line 170 leading to the contact 134. From the contact 134 leads a line 171 to the contact 132 and from said contact leads a line 172 to the solenoid 109 which is connected to the negative side 140 of the current source. From the line 169 branches a line 173 to the clutch magnet 78 for the record sheet feed, said magnet being connected to a line 174 leading over the start key controlled contact 175 to the negative line 140. To the line 174 is connected on the one hand the contact 84 and on the other hand over a line 176 the contact 131, the other side of said contact being over a line 177 in connection with line 140.

Operation of the machine

Now at first the case shall be described if the machine is shifted to the manner of operation where each designation perforation of the record sheets occurs only once; for this manner of operation, the lever shown in Fig. 17b is turned to the right for one fourth revolution so that the pin 195 (Fig. 18b) establishes an operative connection between the links 65 and 64.

If the machine is in rest position all parts are in the position shown in the drawings and the electrical connections as shown in the circuit diagram are established. The address plates are inserted in the magazine 10 (Fig. 17b) with their relief side upwardly directed, the plate with the lowest account number lying lowermost while the plates with numbers increasing in sequential order are following. The operator feeds the unprinted leading end of the continuous record sheet between the rollers 70 and 71 by means of the previously described handwheels in such a way that the sheet lies with its printed side upon the table of the machine. The record sheet is inserted with the end having the lowest account number so that the lists with rising account numbers will follow. If addressing is to be effected in the reverse order, of course, also all address plates must be inserted in the machine in reverse order. If the record sheet is tightly tensioned upon the table 190 of the addressing machine, the contact 137 is closed by contact lever 136 (see Fig. 22) thereby connecting the electrical mechanisms of the machine with the current source. It must still be mentioned that in this starting position of the record sheet all brushes 90 and also the brush 95 are insulated from the contact plate 94 since the leading end of the record sheet is not punched so that in the start position of the sheet there are no holes under the brushes.

In order to start the machine for operation, the operator depresses the start key 175' (Fig. 22) thereby closing the contact 175. Consequently, the clutch magnet 78 for the sheet feed receives current from the lines 169, 173, flowing then over line 174 and contact 175 to the negative line 140. The magnet 178 will therefore be energized and will engage in the previously described manner the clutches 74, 75, thereby operating the feed rollers 70 to feed the record sheet upwardly (Figs. 17a, 17b). Due to the energization of magnet 78 the contact 84 will be closed, said magnet establishing thereby its own stick circuit over the contact 84, line 167, armature 166 of relay 164 and line 165 so that after instantaneous actuation, the start key 175' may again be released and the contact 175 is permitted to open again. The record sheet feed will now be maintained in operation and the sheet will be advanced by the feed rollers 70 until guide hole comes under the brush 95 (Figs. 17a, 17b). In this moment a current impulse will be released from line 142 (Fig. 22) over line 148, contact plate 94, brush 95, line 163, relay 164 and line 165 to the negative line 140, and said impulse will energize relay 164. Consequently the armature 166 will be drawn to the left so that the stick circuit of clutch magnet 78 leading over line 167 and armature 166 will be immediately interrupted, thereby disengaging the clutches 74 and 75, and interrupting the record sheet feed operation. The continuous record sheet will therefore be stopped so that the guide hole will be arrested under the brush 95 and all predetermined hole positions of the list now being in printing position will be under the analyzing brushes 90 for the list perforations. Due to the energization of relay 164 the contact 168 has been closed and since also the contacts 134 and 132 (the coordinated mechanisms now being in home position) are closed, a current will flow over line 169, contact 168, line 170, contact 134, line 171, contact 132, line 172 through the solenoid 109 to the line 140. The solenoid 109 will be energized and will lift its armature so that in the previously described manner analysis of the address plate feeding channel will be effected by means of pins 101 (Figs. 18a and 20). Due to the energization of the solenoid 109 the contact 135 will be closed after the address plate feeding channel has already been analyzed so that the magnet 130 will be energized over line 162. Consequently the frame 128 will be drawn upwardly and the previously described fingers will engage the worm 16 and will be moved to the right. Soon afterwards the contact 126 and a little later also contact 127 will be closed. As has been mentioned above, the current circuit of the comparing magnets will be completed through contact 126. Since now, at the beginning of the addressing work, no address plate is in printing position, there will be no agreement with the perforations of the list being in printing position, and consequently thereof one or a plurality of the magnets 120 will become effective in the moment in which the contact 126 closes. The armature plate 122 will be rocked by said magnets 120 in counterclockwise direction so that the contact 124 opens and the contact 125 will be closed. Timing is provided in such a way that shifting of the contacts 124 and 125 is already completed if the contact 127 is closed by its coordinated slide. In the above assumed case, i. e. if no address plate is yet in printing position, upon closure of contact 127, a current will be sent over line 142, contact 127, line 143, contact 125, line 145 and clutch magnet 63 to the negative line 140 so that by the energization of clutch magnet 63 the one-revolution clutch 49, 50 will be engaged and a plate feeding cycle will be initiated. In the moment in which the one-revolution clutch 49, 50 is engaged, the contact 134 will open due to the cam 134' now moving from its home position so that the current circuit of the analyzing magnet 109 will open which in turn causes opening of contact 135. Consequently thereof, also magnet 130 will become deenergized and the frame 128 will return to its home position thereby also opening immediately the contacts 126 and 127. The magnets 120 will become deenergized and instead of contact 125 the contact 124 will again be closed. It will, however, be noticed that in the current source of the solenoid 109 no contact is open besides the contact 134. The contact 168 is still held closed by the relay 164 since the guide hole is still under the brush 95. On the other hand, also the contact 132 is still closed since the one-revolution clutch 37, 38 for the printing mechanism is not yet engaged. If now a plate has been advanced after one revolution of the cam disk 54, the contact 134 will again be closed by the cam 134' and thereupon the solenoid 109 will again be energized. This causes in the above described way closure of the current circuit of magnet 130 and consequently thereof closure of the contact 126 for actuation of the electrical comparing mechanism. If then there is still no printing plate in printing position, magnet 63 will again be energized, a new plate feeding cycle will be initiated and the solenoid 109 will be deenergized by closure of contact 134. These operations will continue until the first printing plate reaches the printing position; it will be clearly seen that even if said printing plate is not provided with perforations corresponding to those of the list still being in printing position, the next plate will be advanced.

If it is now assumed that for instance after a number of plate feeding cycles a plate comes into printing position the designation perforation of which agrees with the designation perforation of the list still being in printing position, the following operations will take place:

At the end of the preceding plate feeding cycle the contact 134 has been closed thereby deenergizing the solenoid 109. Consequently thereof, the contact 135 will have been closed and the magnet 130 will have been energized which in turn causes closure of contacts 126 and 127 in time sequence. If now the perforations of the list and of the address plate being in printing position are in agreement, both windings of the magnets coordinated to the perforated positions will be compensated while on all imperforate positions no energization of magnets will be effected at all; accordingly the armature plate 122 will remain in the position shown in Figs. 19 and 22 and the contact 134 will also remain closed. If then contact 127 is closed a current will flow from line 142 over contact 127, contact 124, line 144 and clutch magnet 41 to the negative line 140; due to the energization of magnet 41 the one-revolution clutch 37, 38 of the printing mechanism will be engaged. In the previously described mechanical way, however, simultaneously therewith also the one-revolution clutch 49, 50 for the plate feed mechanism will be engaged. During the first quarter of the operating cycle printing of the address plate being in printing position will be effected upon the list being in printing position, and during the second and third quarter of the operating cycle the next plate will be advanced into printing position. Since upon release of both one-revolution clutches the contacts 134 and 132 will open, of course, also the magnets 109 and 130 will immediately be deenergized. After printing has been effected by the printing cam 29, the cam 131' will encounter the contact 131 thereby establishing a shunt circuit to the start contact 175 and deenergizing immediately (still during the same operating cycle) the clutch magnet 78 for the sheet feed mechanism. This magnet establishes then (if contact 131 opens again after having been left by the cam 131') over contact 84, line 167, relay armature 166 and line 165 its own stick circuit; it must be mentioned in this connection that the contact 131 remains closed until the record sheet feed mechanism having been engaged in the meantime has already moved the guide hole away from the brush 95 and that due to relay 164 which has been deenergized thereby, a connection will again be established by armature 166 between line 167 and line 165 before contact 131 opens. It will be clearly seen that immediately after the first quarter of the machine cycle after printing has been effected the sheet feeding operation is initiated while by the plate feed mechanism the next list will now be advanced and as soon as the guide hole 14 of the next list comes under the brush 95, the relay 164 will again be energized so that the stick circuit of the clutch magnet 78 for the record sheet feed is interrupted and the list will again be stopped in printing position. However, simultaneously therewith also the contact 168 will be closed; independently thereof whether the operating cycle of the printing and plate feed mechanism or the operation of the paper feed mechanism is completed first, it is only if both operations are actually completed and if all parts are again in home position that the solenoid 109 will again be energized since its circuit includes as well the contact 168 as the contacts 134 and 132. Due to the energization of the solenoid 109 another comparing cycle will be initiated and depending upon the result of said comparison either the contact 124 remains closed or the contact 125 will be closed. If the contact 125 is closed, upon closure of contact 127 only the plate feed mechanism will be released electromagnetically and the next address plate will be advanced into printing position while the list will stay in its position since the shaft 33 of the printing mechanism is not rotating and consequently thereof also contact 131 will not be closed. However, if the designation perforations are in agreement, the line 143 remains connected with the contact 124 and clutch magnet 41 will be energized which releases the plate feed mechanism as well as the printing mechanism; depending upon the latter the paper feed mechanism will then again be automatically engaged after completion of the printing operation, and a new list will be fed into printing position. It will be clearly seen that all these operations will be repeated in automatic and uninterrupted sequence so that the proper addresses will be printed upon the lists which are fed through the machine one by one.

If the machine shall be adjusted to the manner of operation where a plurality of lists having identical identification perforations may occur, the lever 192 and pin 195 must be adjusted to the position shown in Fig. 18b so that the pin 195 is in vertical position and the one-revolution clutch 49, 50 is mechanically independent from the one-revolution clutch 37, 38, each clutch being then only releasable by its coordinated magnet 41 or 63 respectively. Starting of the operation is then effected in the same way as has been described in connection with the other manner of operation finally the regular addressing operations will take place. Upon agreement of the perforations the one-revolution clutch 37, 38 will be released, due to the energization of magnet 41 and due to said release a printing cycle will be initiated; in the course of said cycle the contact 131 (Fig. 22) will be closed by the rotating cam 131' thereby initiating a record sheet feeding operation. It will, however, be seen that in the present instance (contrary to the other manner of operation) the clutch 49, 50 for the plate feeding mechanism will not be released. Accordingly, a new list will be advanced, and the interruption of the feeding operation will be effected under the control of the guide hole of the next list, said hole being analyzed by the brush 95. If now the next list bears the same designation perforation as the preceding list, i. e. if its perforation agrees with the perforation of the address plate still being in printing position, the contact 124 will remain closed and only magnet 41 will again be energized thereby initiating another printing cycle in the course of which the contact 131 will again be closed to initiate another record sheet feeding operation. The address plate will then still remain in printing position since the clutch for the plate feed mechanism has not been released. These operations will continue as long as the subsequently advanced lists agree with the address plate still remaining in printing position, and accordingly the same plate will be printed upon a number of consecutive lists. If now finally a list with a higher designation number has been advanced, its designation perforation will not agree with the perforation of the address plate being in printing position. Accordingly, as a result of the comparing operation, the contact 125 will be closed and due to the energization of magnet 63 only the clutch 49, 50 will be released thereby initiating a plate feeding cycle. The next plate will now be advanced and the same will be compared with the list being in printing position. If there is no agreement of the respective perforations which is the case if from the preceding list to the list just being in printing position there was a gap in the sequential order of designation numbers, the magnet 63 will be energized and the next plates will be advanced one by one; these operations will continue until the plate having the same designation number as the list in printing position has arrived at the analyzing station. Then there is again agreement and printing will be effected. Subsequently to this printing operation, however, the address plate will remain in printing position and as has been described, the next list will be advanced. If now there is no agreement of the perforations, the next address plate will be advanced while upon agreement printing will be effected and the next record sheet will only be advanced, and in this manner the operating cycles will automatically continue.

If the perforated strip on the left edge of the continuous record sheet shall be cut off, this may be effected either manually subsequently to the addressing operation or immediately upon the addressing machine by a short knife being provided in the table of the addressing machine and projecting beyond the same, and being adapted to sever the record sheet in longitudinal direction in two strips the one containing the perforations and the other one showing only the numerical data as well as the address. If the latter strip is again divided vertically into strips in accordance with the various addresses, single sheets may be obtained from which cannot be seen that the bookkeeping work has been effected entirely automatically.

It is quite evident that the novel method may be performed with the most different types of accounting, punching and addressing mechanisms, and it is obvious that also a manually controlled punching and printing accounting machine may be used. It is also immaterial whether the printed numerical accounting data indicate the result of an addition or subtraction or multiplication or division.

What I claim is:

1. A mechanical method of preparing statements, bills and the like which consists in printing numerical accounting data associated to different designation numbers upon records, punching upon the same records to said numerical data the corresponding designation number perforations, analyzing and comparing the designation number perforations of said records and designation number indexes associated to address carriers, and printing upon agreement of said designation number indexes the address represented on said address carrier upon the corresponding perforated records to print upon the latter the address in addition to the numerical accounting data previously printed thereupon.

2. A mechanical method of preparing statements, bills and the like which consists in printing numerical accounting data associated to different designation numbers upon records, punching upon the same records to said numerical data the corresponding designation number perforations, analyzing and comparing the designation number perforations of said records and designation number indexes associated to address plates, and printing upon agreement of said designation number perforations with said designation number indexes the address plates upon the corresponding perforated records to print upon the latter the address in addition to the numerical accounting data previously printed thereupon.

3. A mechanical method of preparing statements, bills and the like which consists in printing numerical accounting data associated to different designation numbers upon records, punching upon the same records to said numerical accounting data corresponding designation number perforations, analyzing and comparing the designation number perforations of said records with designation number indexes associated to address carriers, the perforated records being arranged in arbitrarily interrupted sequential order according to the designation numbers and the address carriers being also arranged in the same but uninterrupted sequential order, printing upon agreement of the designation number perforation of a record with the designation number indexes of an address carrier the address represented by said address carrier upon the corresponding perforated record to print upon the same the address in addition to the numerical data previously printed thereupon, and always comparing after printing of an address the subsequent perforated record in the series of records with the subsequent address carrier in the series of address carriers and always comparing after disagreement between a perforated record and an address carrier again the same perforated record with the subsequent address carrier in the series of address carriers.

4. A mechanical method of preparing statements, bills and the like which consists in printing numerical accounting data associated to different designation numbers upon records, punching upon the same records to said numerical accounting data corresponding designation number perforations, analyzing and comparing the designation number perforations of said records with designation number indexes associated to address carriers, the perforated records being arranged in arbitrarily interrupted sequential order according to the designation numbers and the address carriers being also arranged in the same but uninterrupted sequential order, printing upon agreement of the designation number perforation of a record with the designation number indexes of an address carrier the address represented by said address carrier upon the corresponding perforated record to print upon the same the address in addition to the numerical data previously printed thereupon, and always comparing after printing of an address the same address carrier whose address has been printed with the subsequent perforated record in the series of records and always comparing after disagreement between a perforated record and an address carrier the same perforated record with the subsequent address carrier in the series of address carriers.

5. A mechanical method of preparing statements, bills and the like which consists in printing numerical accounting data associated to different designation numbers upon records, punching upon the same records to said numerical data corresponding designation number perforations, analyzing and comparing the designation number perforations of said records with designation number indexes associated to address plates, the perforated records being arranged in arbitrarily interrupted sequential order according to the designation numbers and the address plates being also arranged in the same but uninterrupted sequential order, printing upon agreement of the designation number perforation of a record with the designation number indexes of an address plate the latter upon the corresponding perforated record to print upon the same the address in addition to the numerical accounting data previously printed thereupon, and always comparing after printing of an address the subsequent perforated record in the series of records with the subsequent address plate in the series of address plates and always comparing again after disagreement between a perforated record and an address plate the same perforated record with the subsequent address plate in the series of address plates.

6. A mechanical method of preparing statements, bills and the like which consists in printing numerical accounting data associated to different designation numbers upon records, punching upon the same records to said numerical data corresponding designation number perforations, analyzing and comparing the designation number perforations of said records with designation number indexes associated to address plates, the perforated records being arranged in arbitrarily interrupted sequential order according to the designation numbers and the address plates being also arranged in the same but uninterrupted sequential order, printing upon agreement of the designation number perforation of a record with the designation number indexes of an address plate the latter upon the corresponding perforated record to print upon the same the address in addition to the numerical accounting data previously printed thereupon, and always comparing after printing of an address the same address plate which has been printed with the subsequent perforated record in the series of records and always comparing after disagreement between a perforated record and an address plate the same perforated record with the subsequent address plate in the series of address plates.

7. A mechanical method of preparing statements, bills and the like which consists in punching in record cards perforations representing numerical accounting data and designation numbers associated thereto, printing upon other records numerical accounting data and punching upon the same records designation number perforations under the supervision of and in accordance with the numerical accounting data and designation numbers of said perforated record cards, analyzing and comparing the designation number perforations of said printed records and designation number indexes associated to address carriers, and printing upon agreement of said designation number perforations with said designation number of indexes the address represented on said address carriers upon the corresponding perforated records to print upon the latter the address in addition to the numerical accounting data previously printed thereupon.

8. A mechanical method of preparing statements, bills and the like which consists in punching in record cards perforations representing numerical accounting data and designation numbers associated thereto, printing upon other records numerical accounting data and punching upon the same records designation number perforations under the supervision and in accordance with the numerical accounting data and designation numbers of said perforated record cards, analyzing and comparing the designation number perforations of said printed records and designation number indexes associated to address plates, and printing upon agreement of said designation number perforations with said designation number indexes the address plates upon the corresponding perforated records to print upon the latter the address in addition to the numerical accounting data previously printed thereupon.

9. A mechanical method of preparing statements, bills and the like which consists in printing numerical accounting data associated to different designation numbers upon records, punching in the same recording operation upon the same records to said numerical accounting data the corresponding designation number perforations, analyzing and comparing the designation number perforations of said records and designation number indexes associated to address carriers, and printing upon agreement of said designation number perforations with said designation number indexes the address represented on said address carrier upon the corresponding perforated records to print upon the latter the address in addition to the numerical accounting data previously printed thereupon.

10. A mechanical method of preparing statements, bills and the like which consists in punching in record cards perforations representing numerical accounting data and designation numbers associated thereto, printing upon other records numerical accounting data and punching simultaneously therewith upon the same records designation number perforations under the supervision of and in accordance with the numerical accounting data and designation numbers of said perforated record cards, analyzing and comparing the designation number perforations of said printed records and designation number indexes associated to address carriers, and printing upon agreement of said designation number perforations with said designation number indexes the address represented on said address carriers upon the corresponding perforated records to print upon the latter the address in addition to the numerical accounting data previously printed thereupon.

11. A mechanical method of preparing statements, bills and the like which consists in printing numerical accounting data as well as different designation numbers to which said numerical data are associated upon records, punching upon the same records to said designation numbers corresponding designation number perforations, comparing the designation number perforations of said records with designation number indexes associated to address plates having designation numbers embossed thereon in addition to the address, and printing upon agreement of said designation number perforations with said designation number indexes the address plates upon the corresponding perforated records to print upon the latter the address and the corresponding designation number in addition to the numerical accounting data and the designation number previously printed thereupon.

12. A mechanical method of preparing statements, bills and the like which consists in punching in record cards perforations representing numerical accounting data and designation numbers associated thereto; printing upon other records numerical accounting data as well as designation numbers and punching upon the same records designation number perforations under the supervision of and in accordance with the numerical accounting data and designation numbers of said perforated record cards, analyzing and comparing the designation number perforations of said printed records and designation number indexes associated to address plates having designation numbers embossed thereon in addition to the address, and printing upon agreement of said designation number perforations with said designation number indexes the address plates upon the corresponding perforated records to print upon the latter the address and the corresponding designation number in addition to the numerical accounting data and the designation number previously printed thereupon.

13. A mechanical method of preparing statements, bills and the like which consists in printing upon records linewise entries of numerical accounting data associated to different designation numbers, punching upon the same records to each line of numerical accounting data the corresponding designation number perforations, analyzing and comparing the designation number perforations of said records and designation number indexes associated to address carriers, and printing upon agreement of said designation number perforations with said designation number indexes the address represented on said address carriers to the corresponding line of numerical accounting data on said perforated records to print upon the latter to each line of numerical accounting data the corresponding address.

14. A mechanical method of preparing statements, bills and the like which consists in printing upon records groups of linewise entries of numerical accounting data, said groups being associated to different designation numbers, punching upon the same records a corresponding designation number perforation to each group of linewise entries of numerical accounting data, analyzing and comparing the designation number perforations of said records and designation number indexes associated to address carriers and printing to each group of lines of numerical accounting data upon agreement of said designation number perforations with said designation number indexes the address represented on the corresponding address carrier.

15. The method as specified in claim 14 which consists in punching the designation number and printing accordingly the address only to the first line of numerical accounting data in each group of linewise entries of numerical accounting data.

16. The method as specified in claim 14 which consists in punching the designation number and printing accordingly the address only to the last line of numerical accounting data in each group of linewise entries of numerical accounting data.

17. A mechanical method of preparing statements, bills and the like which consists in printing numerical accounting data associated to different designation numbers upon records, punching upon the same records to said numerical data the corresponding designation number perforations according to the hole combinational system, analyzing and comparing the designation number perforations of said records and designation number indexes associated to address carriers, and printing upon agreement of said designation number perforations with said designation number indexes the address represented on said address carriers upon the corresponding perforated records to print upon the latter the address in addition to the numerical accounting data previously printed thereupon.

18. A mechanical method of preparing statements, bills and the like which consists in printing numerical accounting data associated to different designation numbers upon records, punching upon the same records to said numerical data the corresponding designation number perforations, analyzing and comparing the designation number perforations of said records and designation number indexes associated to address carriers, and printing upon agreement of said designation number perforations with said designation number indexes the address represented on said address carriers upon the corresponding perforated records, said method being carried out in two steps, the first step comprising printing of numerical accounting data and punching in the same recording operation the designation number upon each statement and preparing all statements at first in the first step and then addressing in the second step all statements one by one by comparing the designation perforations with the indexes associated to the address carriers.

19. A mechanical method of preparing statements, bills and the like which consists in printing numerical accounting data associated to different designation numbers upon records, punching upon the same records to said numerical data the corresponding designation number perforations, analyzing and comparing the designation number perforations of said records and designation number indexes associated to address carriers, printing upon agreement of said designation number perforations with said designation number indexes the address represented on said address carriers upon the corresponding perforated records to print upon the latter the address in addition to the numerical accounting data previously printed thereupon, and severing thereafter the perforated sections from said records.

20. A mechanical method of preparing statements, bills and the like which consists in punching in record cards perforations representing numerical accounting data and designation numbers associated thereto, printing upon other records numerical accounting data as well as designation numbers and punching simultaneously therewith upon the same records designation number perforations according to the hole combinational system, said printing and punching being under the supervision of and in accordance with the numerical accounting data and designation numbers of said perforated record cards, analyzing and comparing the designation number perforations of said printed records and designation number indexes associated to address plates having designation numbers embossed thereon in addition to the address, printing upon agreement of said designation number perforations with said designation number indexes the address plates upon the corresponding perforated records to print upon the latter the address and the corresponding designation number in addition to the numerical accounting data and the designation number previously printed thereupon, and severing thereafter the record section bearing the hole combinational designation number perforations from the printed record section bearing the numerical accounting data as well as the address and the designation numbers printed under the control of the perforated record cards and the address plates.

MICHAEL MAUL.